United States Patent
Faris et al.

(10) Patent No.: US 6,383,673 B1
(45) Date of Patent: *May 7, 2002

(54) METAL-FUEL CARD WITH A PLURALITY OF METAL-FUEL ELEMENTS AND CORRESPONDING CONTACT APERTURES, AND ELECTRO-CHEMICAL ELECTRIC POWER GENERATION DEVICES EMPLOYING SAME

(75) Inventors: Sadeg M. Faris, Pleasantville; Yuen-Ming Chang, Elmsford; Tsepin Tsai, Peekskill, all of NY (US); Wayne Yao, Bergenfield, NJ (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,889

(22) Filed: Aug. 31, 1998

Related U.S. Application Data

(63) Continuation of application No. 08/944,507, filed on Oct. 6, 1997, now Pat. No. 6,296,960.

(51) Int. Cl.$^7$ .......................... H01M 12/06; H01M 4/70
(52) U.S. Cl. .......................... 429/27; 429/68; 429/128; 429/208; 429/233; 429/234
(58) Field of Search .......................... 429/25, 27, 68, 429/90, 127, 208, 233, 128, 234

(56) References Cited

U.S. PATENT DOCUMENTS

| | | |
|---|---|---|
| 3,252,838 A | 5/1966 | Huber et al. |
| 3,357,864 A | 12/1967 | Huber |

(List continued on next page.)

FOREIGN PATENT DOCUMENTS

| | | |
|---|---|---|
| GB | 1176488 | 1/1970 |

OTHER PUBLICATIONS

Fabrication of Thin–Film LIMN204 Cathodes for Rechargeable Microbateries by F.K. Shokoohi, et. al., Applied Physics Letters, Sep. 1991, pp. 1260–1262.

Battery Chargers by Mike Allen, Popular Mechanics, Sep. 1991, pp. 30–31.New Age EVs by Herb Schuldner, Popular Mechanics, Sep. 1991, pp. 27–29.

Marketing Study for AER Energy Resources, Inc. by Authors not indicated, AER Energy Resources, Inc., 1991 (Month Unknown), pp. 6–28.

Electric Car Showdown in Phoenix by Rick Cook, Popular Science, Jul. 1991, pp. 64–65, 82.

(List continued on next page.)

*Primary Examiner*—Stephen Kalafut
(74) *Attorney, Agent, or Firm*—Kilpatrick & Stockton; Ralph J. Crispino; Gerow D. Brill

(57) ABSTRACT

Improved electro-chemical power generation devices (e.g., metal-air fuel cell battery devices) having metal-fuel realized in the form of a metal-fuel card including a plurality of electrically-isolated metal-fuel elements (e.g., strips) disposed on the surface of substantially rigid and planar non-electrically-conductive substrate. The metal-fuel elements are in electrical contact with the anode contacting elements of the power generation device when the metal-fuel card is spatially registered to anode contacting elements of the electro-chemical power generation device. In another aspect of the present invention, an aperture formed in the substrate provides electrical contact between the metal-fuel element disposed on the first side of the substrate and the anode contacting element disposed on the second side of the substrate when the metal-fuel card is spatially registered to the anode contacting element.

15 Claims, 19 Drawing Sheets

U.S. PATENT DOCUMENTS

| | | | |
|---|---|---|---|
| 3,436,270 A | | 4/1969 | Oswin et al. |
| 3,532,548 A | | 10/1970 | Stachurski |
| 3,536,535 A | * | 10/1970 | Lippincott .................... 429/68 |
| 3,577,281 A | * | 5/1971 | Pountney et al. ....... 429/127 X |
| 3,663,298 A | | 5/1972 | McCoy et al. |
| 3,717,505 A | * | 2/1973 | Unkle et al. ................... 429/27 |
| 3,822,149 A | | 7/1974 | Hale |
| 3,845,835 A | | 11/1974 | Petit |
| 3,909,685 A | | 9/1975 | Baker et al. |
| 3,928,072 A | | 12/1975 | Gerbler et al. |
| 3,963,519 A | | 6/1976 | Louie |
| 3,977,901 A | | 8/1976 | Buzzelli |
| 4,052,541 A | * | 10/1977 | Von Krusenstierna ...... 429/233 |
| 4,152,489 A | | 5/1979 | Chottiner |
| 4,172,924 A | | 10/1979 | Warszawski |
| 4,246,324 A | | 1/1981 | de Nora et al. |
| 4,331,742 A | | 5/1982 | Lovelace et al. |
| 4,551,399 A | * | 11/1985 | Despic ......................... 429/27 |
| 4,626,482 A | | 12/1986 | Hamlen et al. |
| 4,689,531 A | | 8/1987 | Bacon |
| 4,693,946 A | * | 9/1987 | Niksa et al. ............. 429/208 X |
| 4,714,662 A | * | 12/1987 | Bennett ....................... 429/27 |
| 4,828,939 A | * | 5/1989 | Turley et al. ............. 429/27 X |
| 4,913,983 A | | 4/1990 | Cheiky |
| 4,950,561 A | | 8/1990 | Niksa et al. |
| 4,957,826 A | | 9/1990 | Cheiky |
| 4,968,396 A | | 11/1990 | Harvey |
| 5,121,044 A | | 6/1992 | Goldman |
| 5,185,218 A | | 2/1993 | Brokman et al. |
| 5,190,833 A | | 3/1993 | Goldstein et al. |
| 5,196,275 A | | 3/1993 | Goldman et al. |
| 5,242,765 A | | 9/1993 | Naimer et al. |
| 5,260,144 A | | 11/1993 | O'Callaghan |
| 5,306,579 A | | 4/1994 | Shepard et al. |
| 5,312,701 A | | 5/1994 | Khasin et al. |
| 5,318,861 A | | 6/1994 | Harats et al. |
| 5,328,777 A | | 7/1994 | Bentz et al. |
| 5,328,778 A | | 7/1994 | Woodruff et al. |
| 5,354,625 A | | 10/1994 | Bentz et al. |
| 5,360,680 A | | 11/1994 | Goldman et al. |
| 5,362,577 A | | 11/1994 | Pedicini |
| 5,366,822 A | | 11/1994 | Korall et al. |
| 5,387,477 A | | 2/1995 | Cheiky |
| 5,389,456 A | | 2/1995 | Singh et al. |
| 5,405,713 A | | 4/1995 | Pecherer et al. |
| 5,411,592 A | | 5/1995 | Ovshinsky et al. |
| 5,418,080 A | | 5/1995 | Korall et al. |
| 5,439,758 A | | 8/1995 | Stone et al. |
| 5,447,805 A | | 9/1995 | Harats et al. |
| 5,462,816 A | * | 10/1995 | Okamura et al. ......... 429/27 X |
| 5,486,429 A | | 1/1996 | Thibault |
| 5,532,086 A | * | 7/1996 | Thibault et al. ........ 429/234 X |
| 5,536,592 A | * | 7/1996 | Celeste et al. .......... 429/127 X |
| 5,554,452 A | | 9/1996 | Delmolino et al. |
| 5,569,551 A | | 10/1996 | Pedicini et al. |
| 5,582,931 A | | 12/1996 | Kawahami |
| 5,599,637 A | | 2/1997 | Pecherer et al. |
| 5,691,074 A | | 11/1997 | Pedicini |
| 5,711,648 A | | 1/1998 | Hammerslag |
| 5,721,064 A | | 2/1998 | Pedicini et al. |
| 5,726,551 A | | 3/1998 | Miyazaki et al. |
| 5,771,476 A | | 6/1998 | Mufford et al. |
| 5,904,999 A | | 5/1999 | Kimberg et al. |
| 5,978,283 A | | 11/1999 | Hsu et al. |
| 6,057,052 A | | 5/2000 | Shrim et al. |

OTHER PUBLICATIONS

Batteries for Cordless Appliances by Ralph J. Brodd, Ch. 3 of Batteries for Cordless Appliances, 1987 (Month N A), pp. 49–59.

Convert 3V To 5V Without Inductors by, Maxim Integrated Products; http://www.maxim–ic.com, vol. 92, 2000 (Month Unknown), pp. 1–3.

Derive 5V From Four AA Cells by, Maxim Integrated Products; http://www.maxim–ic.com, vol. 128, 2000 (Month Unknown), pp. 1–2.

Boost/Linear Regulator Derives 5B From Four Cells by, Maxim Integrated Products, http://www.maxim–ic.com, 2000 (Month Unknown).

Fuel Cell Technology & Applications, http://www.metallicpower.com/rtfuel.htm by, Metallic Power, Inc., 1999 (Month Unknown).

Fuel Cells and Their Applications by Karl Kordesch and Gunter Simader, VCH Publishers, Inc., New York NY, Chapters 4.8.1–4.8.2, 1996, (Month N A), pp. 158–162.

LBL Researchers Work on New Generation of Batteries by Jeffery Kahn, www.lbl.gov/Science–Articles/Archive/battery–development–at–lbl.html, 1990 (Month Unknown), pp. 1–6.

PCT/US98/21257 Search Report, Apr. 1999.

PCT/US98/21260 Search Report, Feb. 1999.

PCT/US98/21256 International Search Report, Feb. 1999.

* cited by examiner

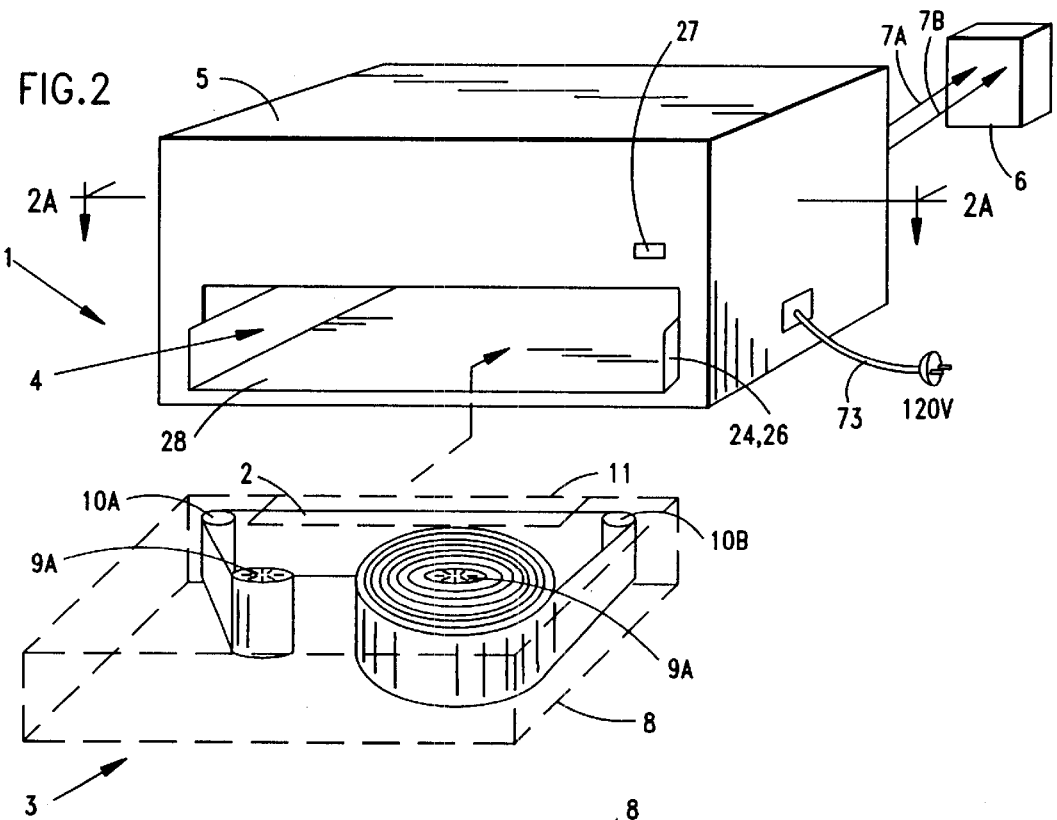
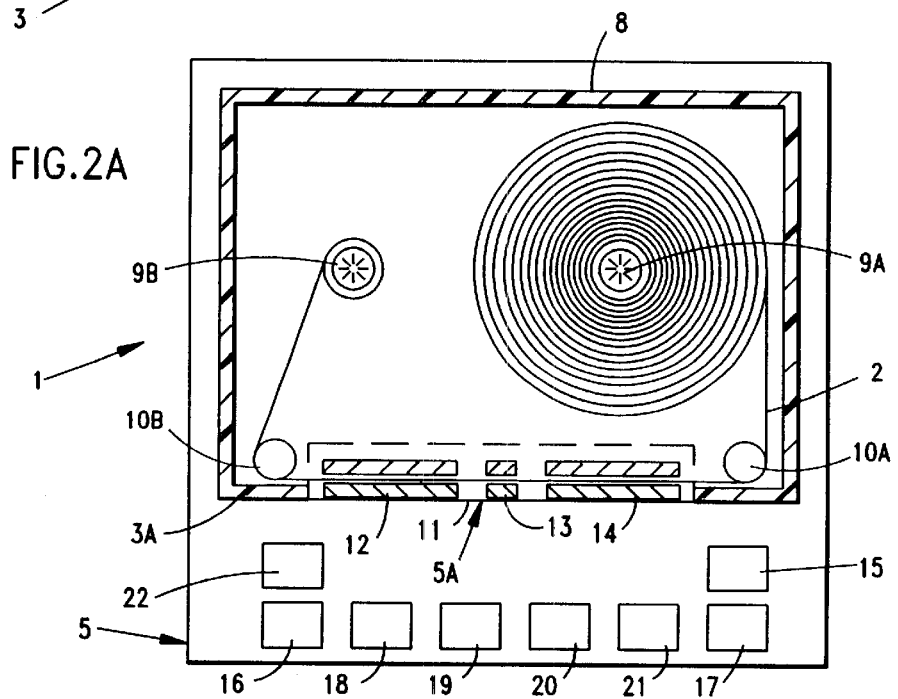

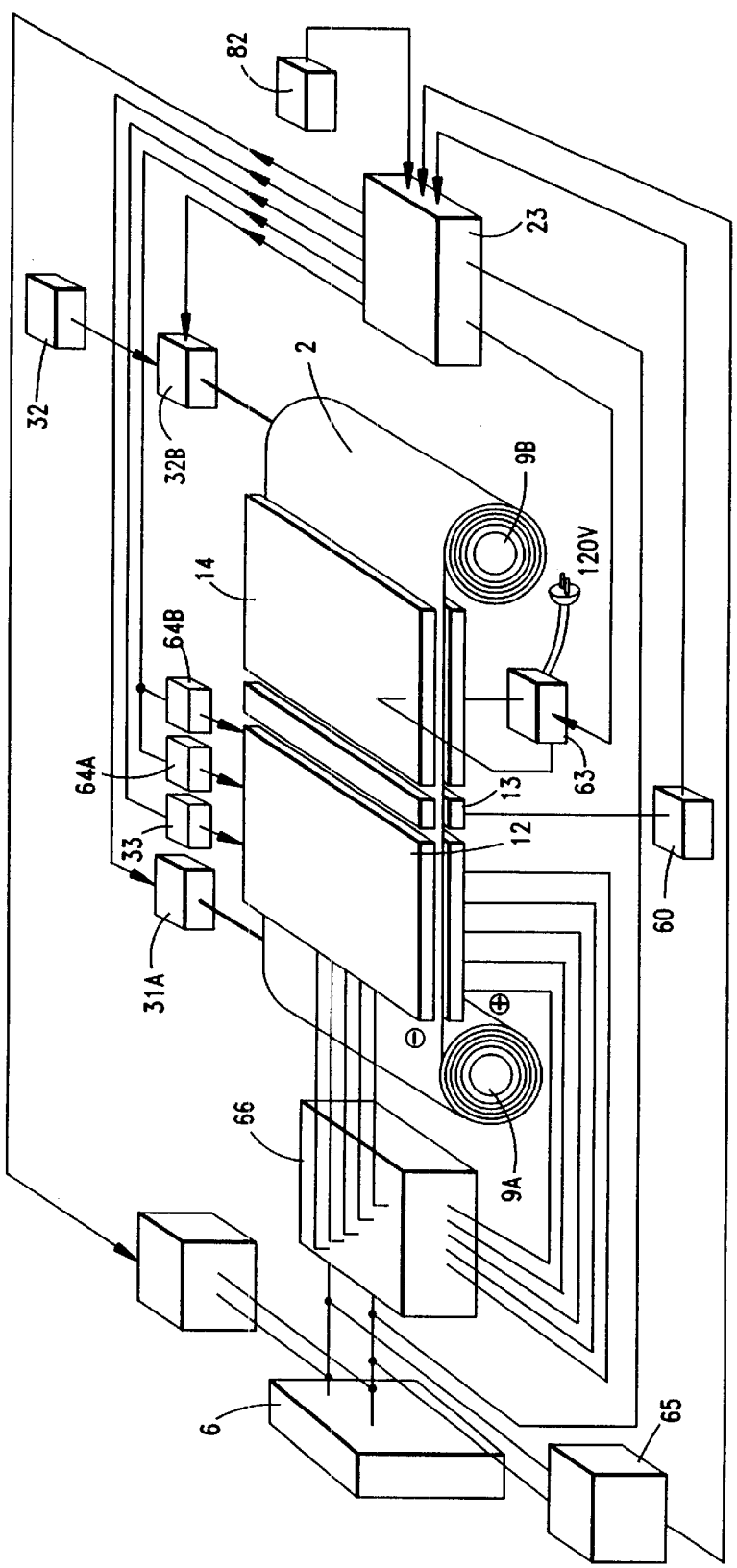

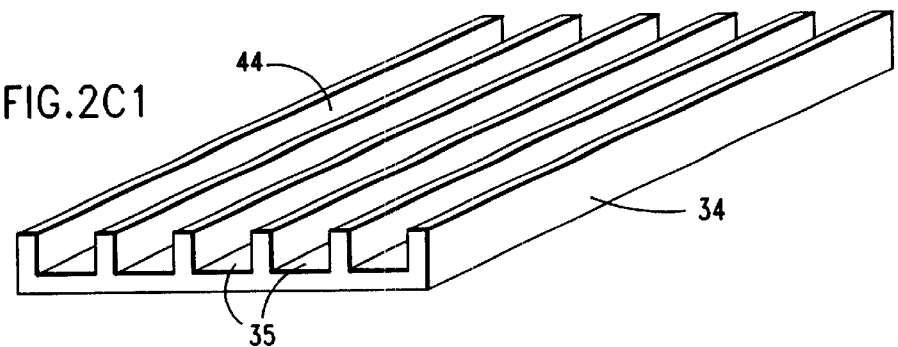
FIG.2C1
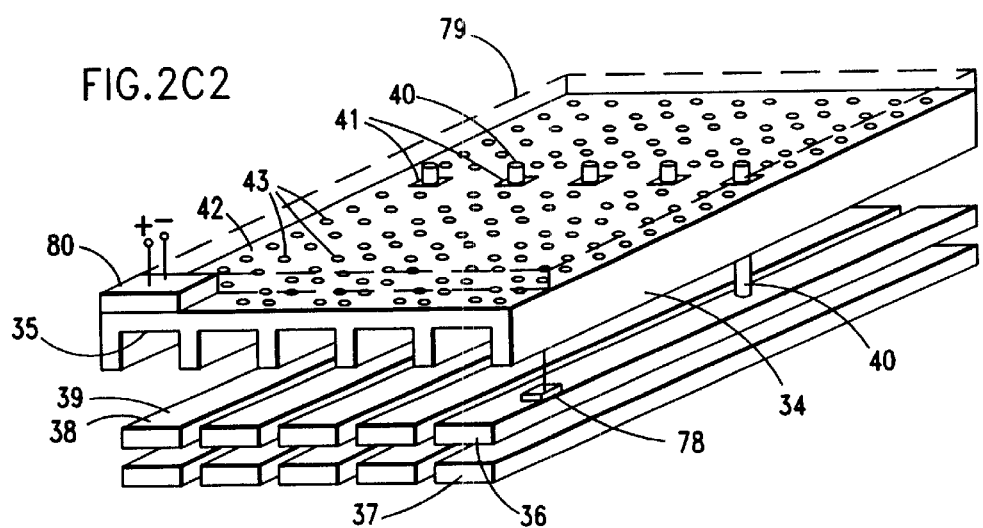
FIG.2C2
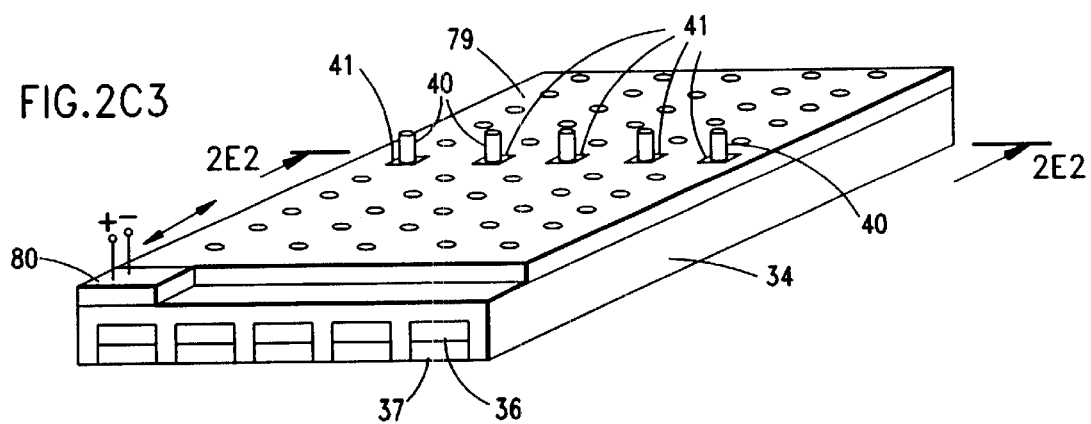
FIG.2C3

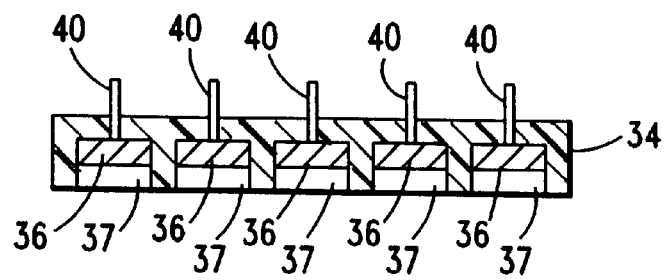
FIG. 2C4
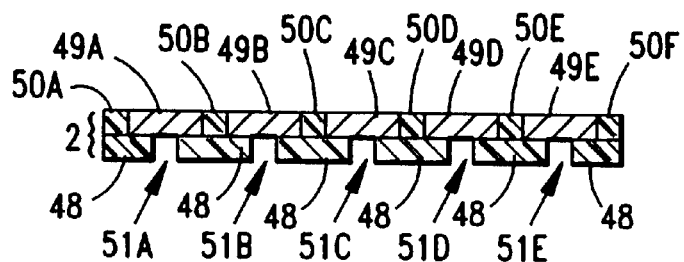
FIG. 2D2
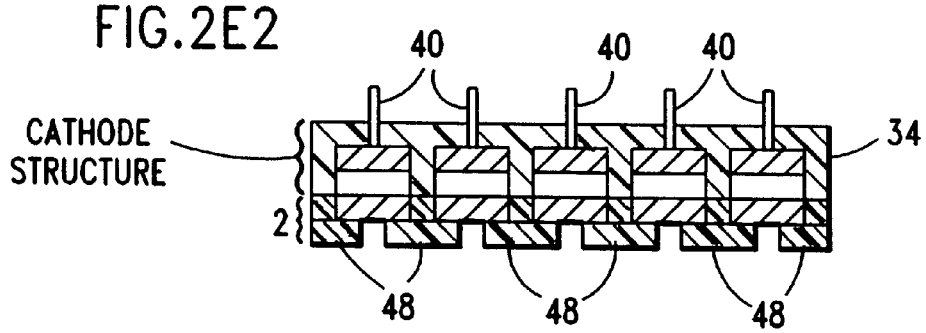
FIG. 2E2
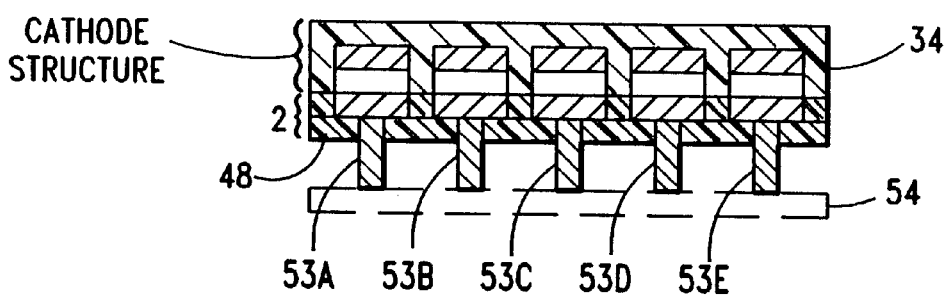
FIG. 2E3

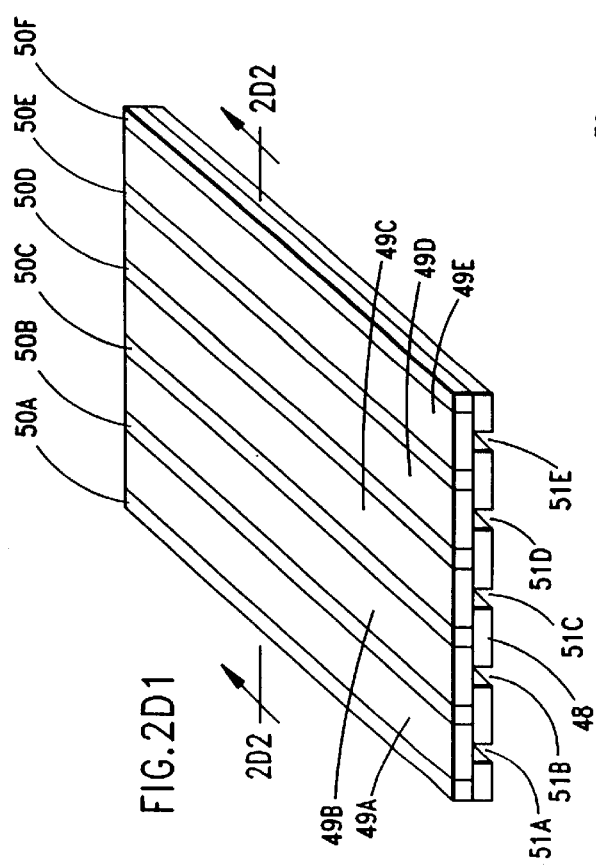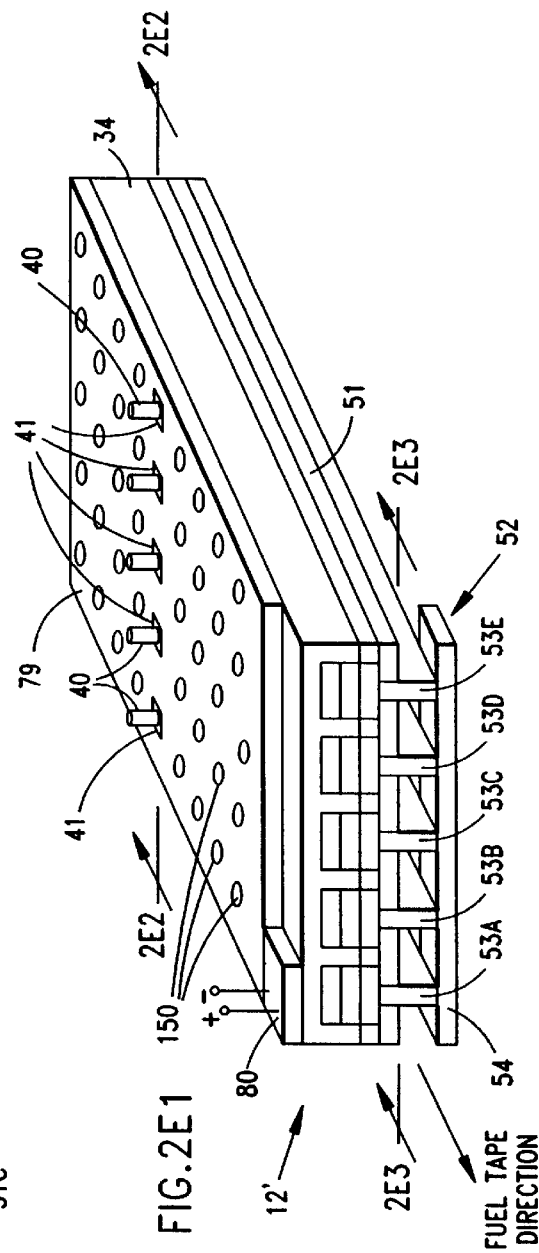

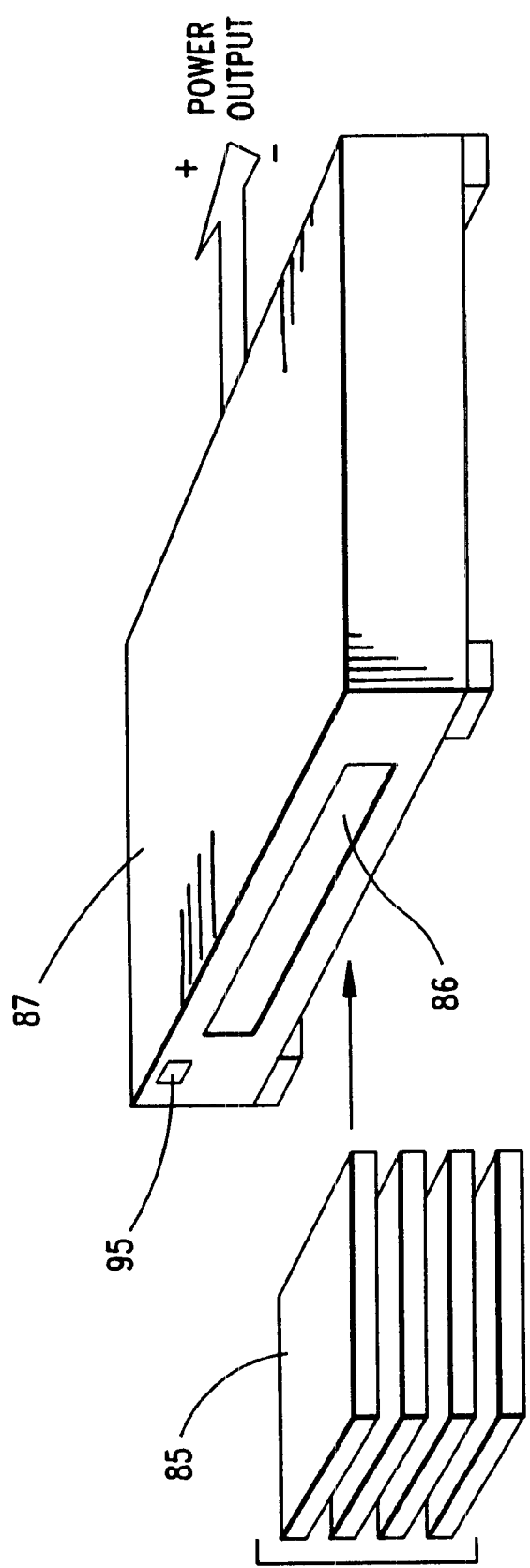

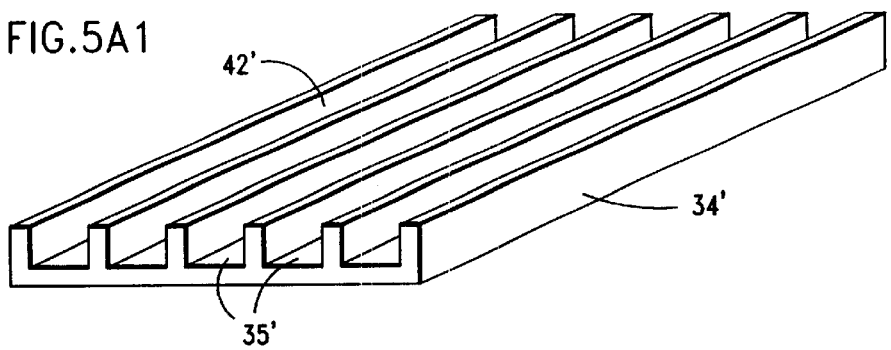
FIG.5A1
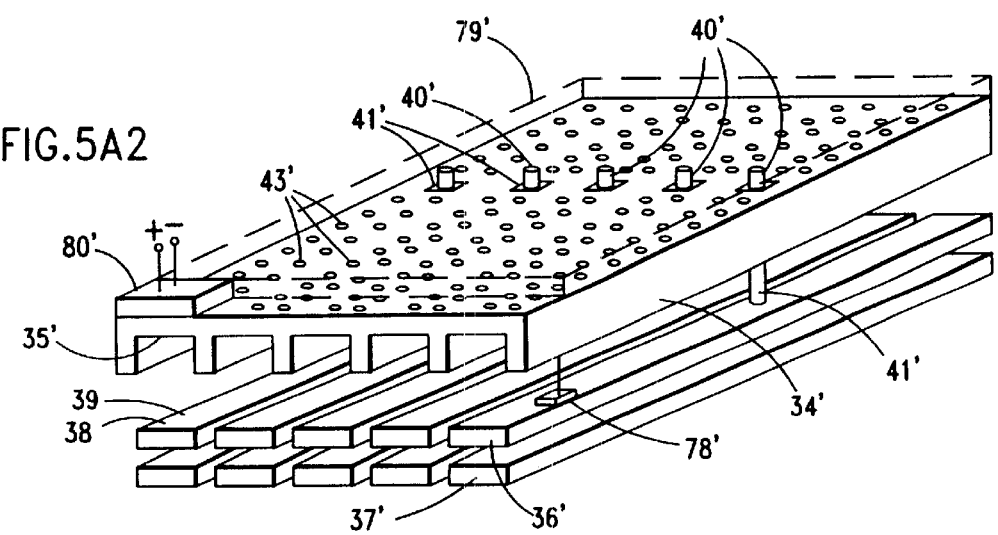
FIG.5A2
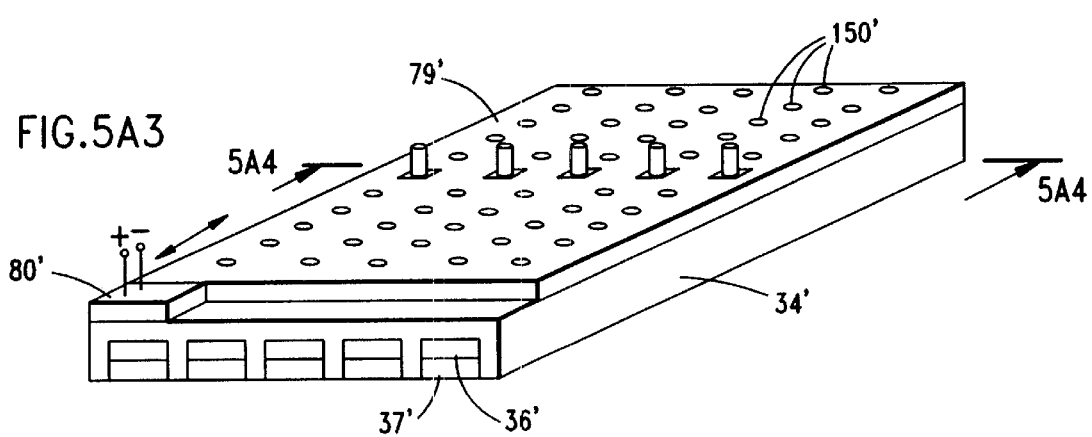
FIG.5A3

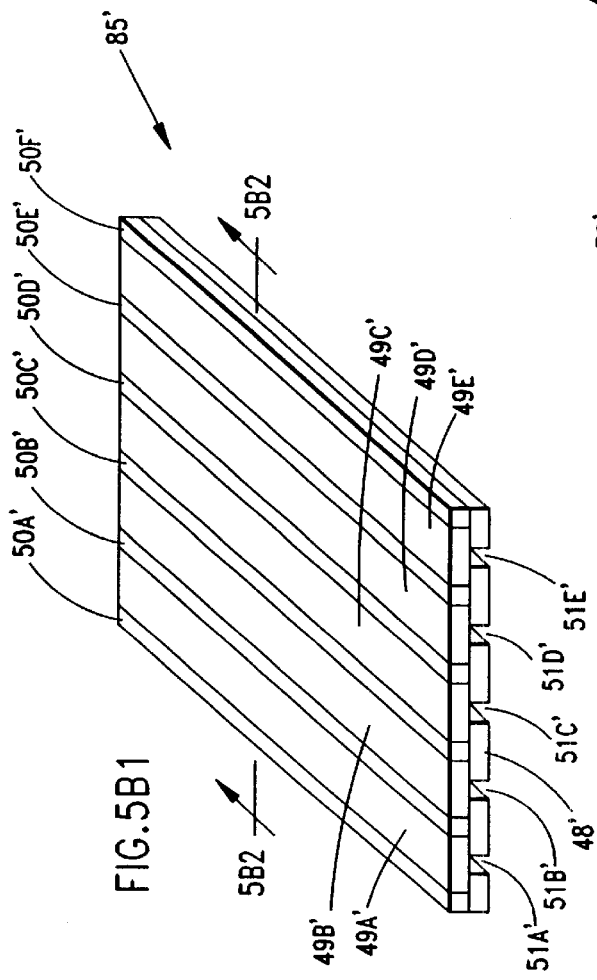
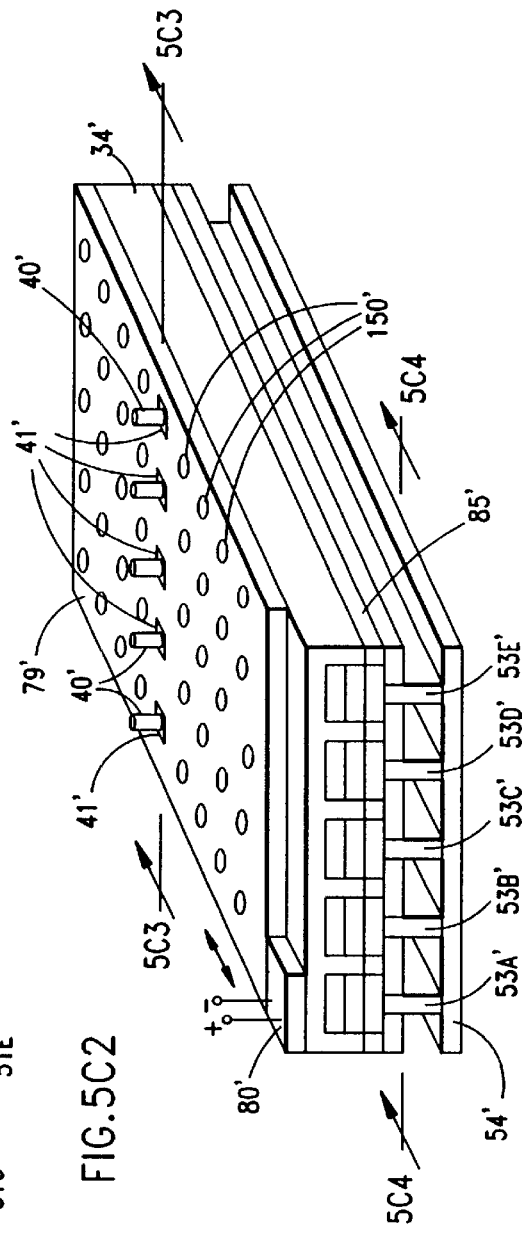
FIG.5B1
FIG.5C2

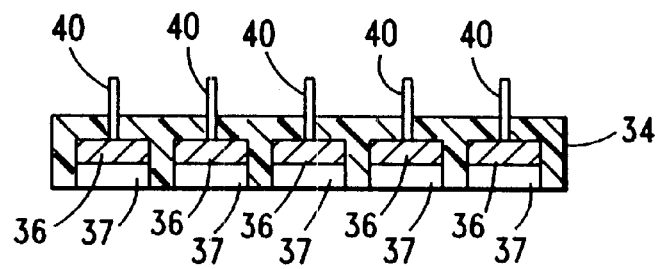
FIG.5A4
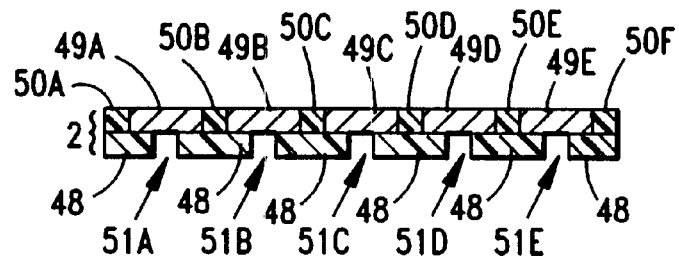
FIG.5B2
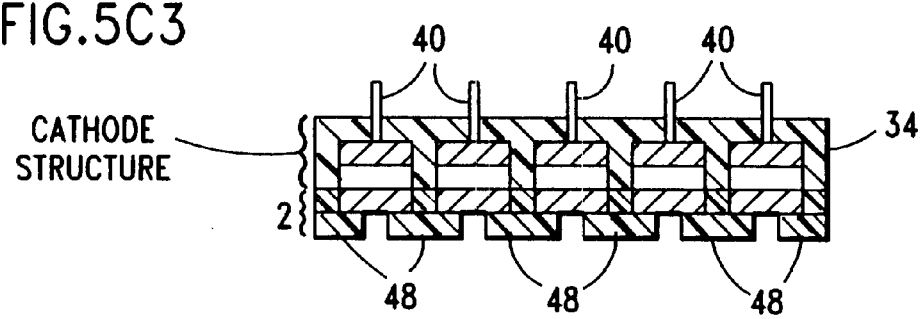
FIG.5C3
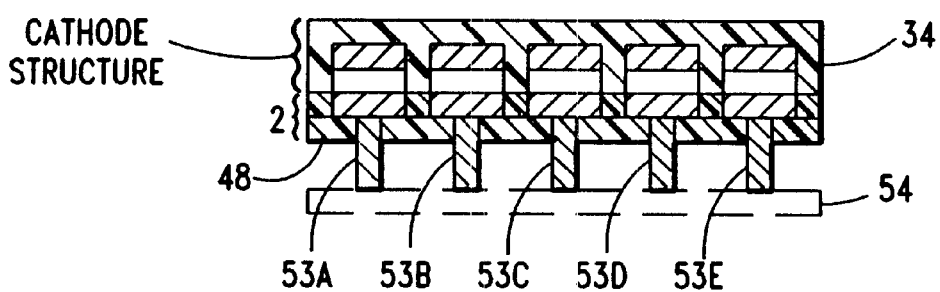
FIG.5C4

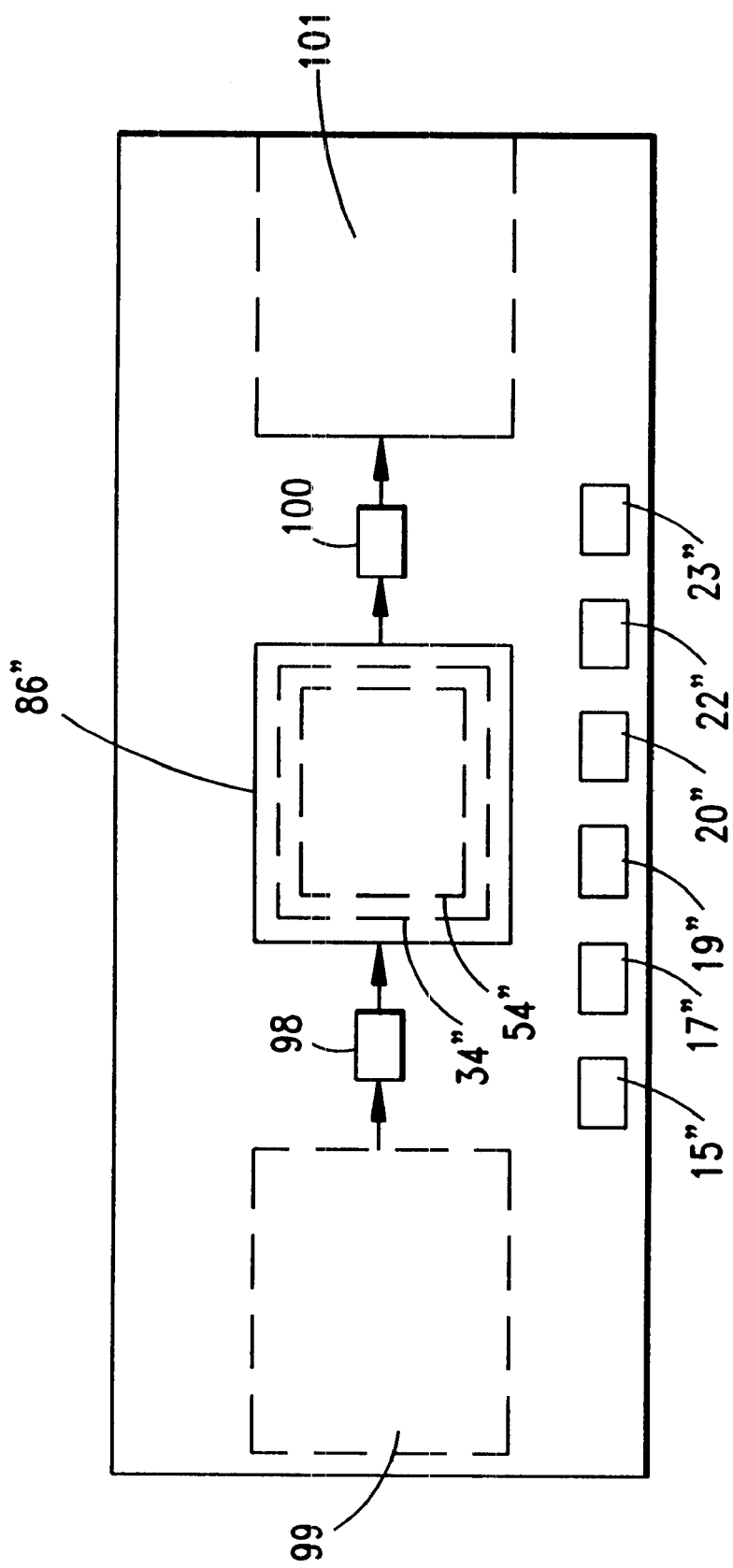

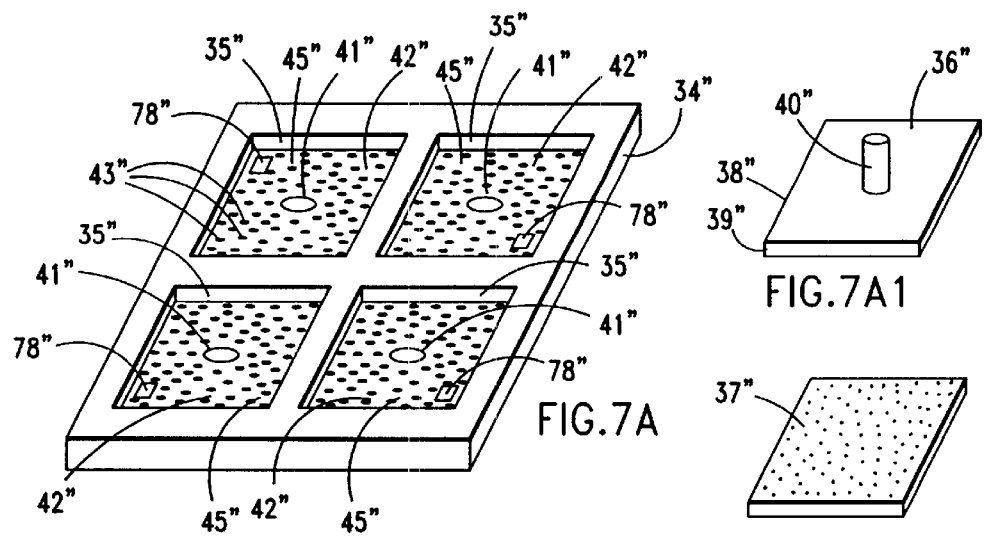
FIG.7A
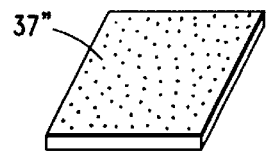
FIG.7A1
FIG.7A2
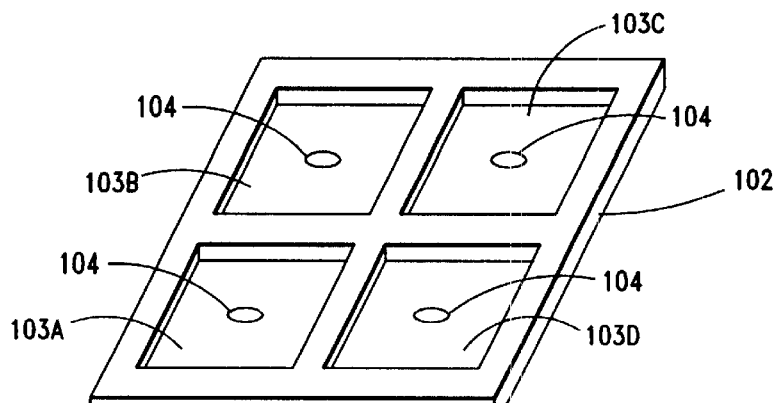
FIG.7B
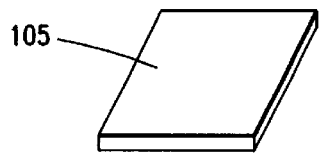
FIG.7B1
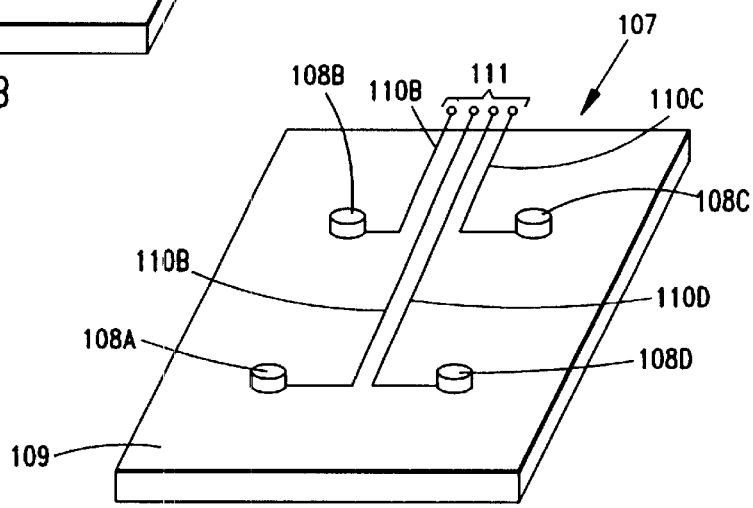
FIG.7C

METAL-FUEL CARD WITH A PLURALITY OF METAL-FUEL ELEMENTS AND CORRESPONDING CONTACT APERTURES, AND ELECTRO-CHEMICAL ELECTRIC POWER GENERATION DEVICES EMPLOYING SAME

RELATED CASES

This Application is a Continuation of copending Application No. 08/944,507, entitled "System And Method For Producing Electrical Power Using Metal-Air Fuel Cell Battery Technology" by Sadeg M. Faris, Yuen-Ming Chang, Tsepin Tsai and Wayne Yao, filed Oct. 6, 1997 now U.S. Pat. No. 6,296,960.

BACKGROUND OF THE INVENTION

1. Field of the Invention

The present invention relates to improved methods and systems for electrochemically producing electrical power using metal-air fuel cell battery technology.

2. Description of the Prior Art

More than ever, there is a great need in the art for ways and means of reliably producing small and large amounts of electrical energy for powering various types of electrical systems and devices. It can be helpful to classify these various types electrical systems and devices (conventionally called "electrical loads") into four different market areas, namely: the Portable Electronics Market which includes products such as portable computers, cellular phones, camcorders, cassette tape players, etc requiring less than 100 Watts; the Portable Electric Power Tools Market which includes products such as lawn mowers, screw drivers, drills, saws, etc. requiring more than 100 W but less than 1.0 kilowatt; the Transportation Market which includes products such as power passenger vehicles, buses, golf carts, motorcycles, boats, etc. requiring more than 1.0 kilowatt but less than 100 kilowatt; and the Stationary Power Market which includes products such as multi-megawatt systems for powering homes, schools, factories, office buildings, and other distributed generation applications, requiring more than 10 kilowatt. But less than 200 kilowatts.

Presently, there exists a number of different concepts and techniques for producing electrical power. Among these various concepts and techniques, the technique of Electrochemical Energy Conversion is most popular in the contemporary period inasmuch as it enables the direct production of electrical power from chemical compositions with relatively high energy density on a weight basis (measured in Watt Hours per Kilogram) with relatively high current densities (measured in Amperes per Centimeters2). Examples of devices based on the Electrochemical Energy Conversion concept include: battery cells; fuel cells; and fuel cell batteries (FCB).

Early storage batteries employed lead-acid cells, and then other combinations such a nickel with iron, cadmium, zinc or hydrogen and silver-iron, zinc-bromine, zinc-chlorine were developed with increasing energy quantities per weight. Presently, conventional battery cells are based on one of the following composition pairs: lead acid; nickel-cadmium; and nickel-metal hydrides (NiMH) As battery developers seek to improve energy storage capacity and energy stored per kilogram, they continue to focus on the use of materials. The development of the zinc-air battery is indicative of this research approach.

The electrochemical storage battery is a well known device having many applications. The storage, or secondary battery, is characterized in being capable of accepting direct-current (DC) electrical energy in a changing phase, retaining the energy in the form of chemical energy in the charge retention phase and releasing its energy on being connected to an external load in the discharge phase. The storage battery is capable of repeatedly performing these three phases over a reasonable life cycle.

The structure of the storage battery is typically a construction including one or more identical units called cells. Each cell contains plates referred to as positive (anode) and negative (cathode) electrodes contained in an electrolyte. When a charged storage battery cell is discharged through a load, the plates and the electrolyte undergo a chemical change wherein the negative cathode loses electrons and the positive anode gains electrons thereby providing a current flow. During charging, the original conditions of the battery are restored by passing through it a current opposite to that produced during the discharge.

Conventional battery technologies based on lead acid, nickel-cadmium, or nickel-metal hydrides have limited operation time, long recharge time, low energy density, hazardous chemical materials requiring special encapsulation containers and careful disposal, fixed electrode areas, and in electrical automobile applications, conventional battery systems result in limited driving distances. Nickel-metal hydride (NiMH) batteries are attractive from the stand point that they eliminated cadmium, a very toxic substance. However, they deliver less power, have a faster self-discharge rate, and are less tolerant of overcharging.

Because of the enormous market potential, the shortcomings of conventional batteries represent a great opportunity to innovators and entrepreneurs to introduce battery products based on radically new concepts which overcome those shortcomings. Indeed, there is ample evidence of intense R&D activities and significant investments directed towards battery development.

Lithium-polymer batteries promise substantial improvements in energy density. Lithium battery systems employ a lithium anode, a polymer electrolyte and a composite cathode such as CuO, CuS, or FeS. Battery cells of this type are described in the Aug. 19, 1991, Electronic Engineering Times in the publication "Batteries Slim Down For Portability" by Colin Mackay and Robert Kline, Jr. at page 52. However, a major drawback with this battery cell design is that lithium's high reactivity with liquid electrolytes erodes the electrodes of such battery cells. While recent developments in solid state electrolytes have reduced this problem, a number of problems still remain, namely: dendrite formation on the electrodes; and the hazardous effects of lithium on the environmental.

Zinc-air battery technology is environmental friendly, but current batteries are limited to fixed area, resulting in low perceived specific power rating.

Batteries which are reliable, environmentally benign, have energy densities in excess of 200 Watt-hour per kilograms (lead-acid has only 35), and can be recharged faster, can find uses not only in portable electronics but also in consumer appliances, electric vehicles, and in the utilities industry. However, batteries with all of these desirable characteristics do not yet exist.

All conventional batteries, including conventional zinc-air batteries, are designed to have a fixed area, and thus a fixed stored energy determined by the voltage times the charge per unit volume. Traditional battery designers continue to adopt the fixed area design methodology and, therefore, are hindered by fundamental constraints including: (1) the larger the battery capacity, the longer it takes to recharge; (2) every unit weight of the anode is nearly matched by the weight of the cathode, the weight of the electrolyte, as well as the weight of the container; this overhead is the source of low energy density; (3) pulse power is inversely related to the energy capacity; and (4) only one set of electrodes are available for the sequential discharge and recharge cycles.

Fuel Cells been known for more than one hundred years. Conventional fuel cells are electrochemical devices that convert chemical energy of the fuel directly into usable electricity and heat without combustion of the fuel. The electrochemical reactions are not reversible (i.e., rechargeable). Fuel cells are similar to battery cells in that both produce a DC current by using an electrochemical process. Both fuel cells and batteries have positive and negative electrodes (i.e. the anodes and cathodes) and an ionic conductor or electrolyte. The primary difference between fuel cells and battery cells is that battery cells have only a limited amount of stored energy, whereas fuel cells will continue to produce electrical power output as long as fuel and oxidant are supplied thereto.

Conventional fuel cells operate by combining hydrogen with oxygen to release electricity (i.e. charge), heat, and water. The supply of fuel can be pure hydrogen. Hydrogen can also be extracted from natural gas, or other hydrocarbons by using a reformer. Fuel cells emit essentially none of the sulfur and nitrogen compounds released by conventional "combustion-based" electrical power generating methods employing fossil and like kinds of fuel.

Presently, several different conventional fuel cell technologies are being considered by the power industry for power generation. Phosphoric Acid Fuel Cells (PAFCs); Molten Carbonate Fuel Cells (MCFCs); Solid Oxide Fuel Cells (SOFCs); and Solid Polymer Fuel Cells (SPFCs). These different fuel cell technologies differ in terms of the composition of the electrolyte used, and each are presently at different stages of development.

Phosphoric Acid Fuel Cells (PAFCs) are the most mature of the fuel cell technologies. Platinum is required as a catalyst for the electrodes. "Reforming" of the natural gas feedstock to a hydrogen-rich gas must be accomplished outside the fuel cell stacks. Due to PAFC materials and complexity, capital costs are higher and efficiencies are lower than those projected for the Molten Carbonate Fuel Cells and Solid Oxide Fuel Cells.

Molten Carbonate Fuel Cells (MCFCs) operate at higher temperatures, (at or slightly above ambient pressure) and uses less expensive nickel-based electrodes than PAFCs. Reforming can occur either inside or outside the fuel cell stacks. The higher operating temperature of MCFCs provides the opportunity for achieving higher overall system efficiencies (potential for heat rates below 7,500 Btu/kWh) and greater flexibility in the use of fuels. On the other hand, the higher operating temperature places severe corrosion and sealing demands on the stability and life of cell components, particularly in the aggressive environment of the molten carbonate electrolyte.

Solid Oxide Fuel Cells (SOFCs) are the least mature of fuel cell technologies. SOFCs use a zirconia ceramic as the electrolyte. The electrochemical conversion process occurs at very high temperatures (1200(C) and thus supports internal reforming. The cells may be either flat plates or tubular cylinders. There are basic manufacturing challenges, as yet unsolved, in mass producing these cells. SOFCs promise to operate at moderately high efficiencies with a high-grade waste heat output.

Solid Polymer Fuel Cells (also known as the proton exchange membrane fuel cell, PEMFC) operates at a much lower temperature (around 90° C.), because of the limitations imposed by the thermal properties of the membrane materials. SPFCs are quickly contaminated by CO. They require cooling and management of the exhaust water in order to function properly. The main focus of current designs is transportation applications, as there are advantages to having a solid electrolyte for safety. The heat produced by this type of fuel cell is not adequate for any significant by-product usage. There is a possibility that this particular type of fuel cell can be used for both transportation and stationary power applications.

Prior art hydrogen-oxygen fuel cells of the type described above suffer from a number of shortcomings and drawbacks that have restricted their widespread usage. In particular, prior art hydrogen-oxygen fuel cells require operation at either high pressure and/or temperature. The hydrogen-oxygen fuel poses risk of explosion and requires careful handling and distribution. These fuel cells require a co-generation application for the heat produced in order to reach high efficiency levels.

These fuel cells are unlikely to be scaled down for use in portable electronic applications. The expected cost per kW for these fuel cell power generation systems is still far above the target of $1,000/kW. Gradual stack degradation over their projected life mandates costly periodic replacement of the cell stacks. U.S. Pat. No. 3,432,354 to Jost, apparently a pioneering US Patent, discloses an air-metal fuel cell battery (FCB) system, in which the anode is moved past the stationary cathode during discharge and charging operations. In the illustrative embodiments disclosed therein, the anode is based on metals such as zinc, aluminum, and other alloys, and not on hydrogen. The anode material is arranged as a roll of thin zinc foil wound on a supply roller. As the fuel moves past a discharge cathode, and is taken up on a take-up roller in the presence of an electrolyte, electrical power is produced across the anode and cathode and removed by an electrical load connected thereto. In this FCB system design, the anode tape is required to be pervious to the electrolyte used. Moreover, the arrangement of the anode and cathode element render it impossible to produce high energy density systems U.S. Pat. No. 5,250,370 to Applicant discloses an improved airmetal FCB system, wherein the ratio of the recharge cathode area to the discharge cathode area is much larger than unity, resulting in a much faster recharge time.

Notwithstanding such limitations, the air-metal FCB design of the type described in U.S. Pat. Nos. 5,250,370 and 3,432,354 has numerous advantages over traditional hydrogen-based fuel cells.

In particular, the supply of energy provided from air-metal FCB systems is inexhaustible because the fuel, zinc, is plentiful and can exist either as the metal or its oxide but will never vanish from the earth. Plentiful solar, hydroelectric, or other forms of energy can be used to convert the zinc from its oxide product back to the metallic fuel form.

The air-metal FCB system has the highest energy density of any alternative technology, i.e. in excess of 500 Watt Hour/Kg. The air-metal FCB allows more than 24 hours of continuous operation for either notebook computer or cellular phone, assuming batteries whose dimensions are comparable to existing ones. When used in electric vehicles (EVs), the FCB has a range of about 500 miles.

Unlike conventional hydrogen-oxygen fuel cells which require refilling, the fuel of an air-metal FCB is recoverable by electrically recharging. The fuel of the air-metal FCB is solid state, therefore, it is safe and easy to handle and store. In contrast to hydrogen-oxygen FCBs, which use methane, natural gas or LNG to provide as source of hydrogen, and emit polluting gases, the air-metal FCB results in zero emission. The air-metal FCB operates at ambient temperature, whereas hydrogen-oxygen fuel cells operate at temperatures in the range of 150° C. to 1000° C. Air-metal FCBs are capable of delivering higher output voltages (1.5–3 Volts) than conventional fuel cells (<0.8 V).

The air-metal FCB has two simultaneous functions, energy storage (rechargeable secondary battery functions) and energy generation (fuel cell function). Consequently, the air-metal FCB can charge and recharge simultaneously and automatically adapt to different load conditions while maintaining peak efficiency. The output power density of the air-metal FCB is independent of its energy storage capacity.

While air-metal FCB technology offers fundamental advantages of FCB systems over conventional fuel cell systems, prior art air-metal FCB systems suffer from a number of shortcomings and drawbacks.

In particular, the output voltages produced from prior art air-metal FCB systems are fixed by virtue of the construction of the cathode and anode structures of such prior art systems.

In prior art air-metal FCB systems, the physical configuration of the metal (e.g. Zinc) fuel in relation to the air-pervious cathode structure has not enabled the design or manufacture of electrochemical power supplies with ultra-compact construction required for portable electronic devices, such as radios, cellular-phones, laptop computers, and the like.

In prior art air-metal FCB systems, the mechanisms used to supply metal fuel to the air-pervious cathode structure have been unsuitable for meeting the electrical energy requirements of various classes of users. For example, in connection with low power consuming devices, such as cellular phones and laptop computers, it has not been possible to design or make air-metal FCB systems of ultra-compact design.

Thus there is a great need in the art for an improved method and apparatus for electrochemically producing electrical power while overcoming all of the limitations of known battery and conventional fuel cell technologies.

OBJECTS AND SUMMARY OF THE INVENTION

Accordingly, a prime object of the present invention is to provide improved method and apparatus of electrochemically producing electrical power while overcoming all of the limitations of known battery and conventional fuel cell technologies.

Another object of the present invention is to provide a metal-air fuel cell battery (FCB) system, wherein the fuel is provided in the form of a metal tape contained within a cassette-type device that is insertable within a storage bay of a compact power generation unit.

Another object of the present invention is to provide such as system, in which the fuel tape is multi-tracked in order to enable the generation and delivery of electrical power over a range of different output voltages selectable by the user.

An object of the present invention is to provide such an air-metal FCB system, wherein the anodes of individual cells are dynamically moved with respect to corresponding cathodes during power generation mode of operation.

Another object of the present invention is to provide such an FCB system, wherein the power generation head has multiple pairs of electrically-isolated cathode and anode structures which can selectively reconfigured under electronic control in order to select a desired output voltage for supplying electrical power from the FCB system to an electrical load connected thereto.

Another object of the present invention is to provide such a system, in which a subsystem is provided for controlling the flow of oxygen into the porous cathode elements in the power generation head of the system, as well as the speed of the metal fuel tape across the power generation head of the system.

Another object of the present invention is to provide such a system, wherein an oxide-sensing head is provided up-stream for sensing which fuel tracks have been discharged (i.e. oxidized), and a recharging head is disposed downstream having multiple pairs of electrically-isolated cathode and anode structures for selectively recharging only those fuel tracks that have been oxidized.

Another object of the present invention is to provide an automatically loading air-metal FCB system, wherein a metal fuel card is automatically loaded into the power generation unit of this illustrative embodiment, and during power generation the anode structure thereof is maintained in a stationary relationship with respect to the cathode structure of the power generation unit, and after the anode fuel card is completed oxidized (i.e. consumed), the fuel card is automatically ejected and another fuel card is replaced in the unit for consumption.

Another object of the present invention is to provide such an FCB system, wherein a multi-track discharging head having multiple pairs of electrically-isolated cathode and anode structure are provided for selective configuration under electronic control in order to produce a desired output voltage for supplying electrical power from the FCB system to an electrical load connected thereto.

Another object of the present invention is to provide a manually loading air-metal FCB system, wherein a metal fuel card is manually loaded into the power generation unit of this illustrative embodiment, and the anode structure thereof is maintained in a stationary relationship with respect to the cathode structure of the power generation unit during power generation.

Another object of the present invention is to provide such an FCB system, wherein a multi-track discharging head having multiple pairs of electrically-isolated cathode and anode structure are provided for selective configuration under electronic control in order to select a desired output voltage for supplying electrical power from the FCB system to an electrical load connected thereto.

Another object of the present invention is to provide such a system, in which a subsystem is provided for controlling the flow of oxygen into the porous cathode elements in the power generation head of the system.

Another object of the present invention is to provide an air-metal FCB system, which has improved performance parameters, such as higher energy density, shorter recharge time, higher amounts of stored energy, minimum hazard potential and disposal problems are enormously important.

Another object of the present invention is to provide an air-metal FCB system, wherein the generation of electrical power is "decoupled" (i.e. essentially independent of) the storage of energy to provide unprecedented design flexibility, making the development of FCBs systems for different applications possible at low cost and with short time to market.

Another object of the present invention is to provide an air-metal FCB system, wherein solid state fuel, when consumed, is converted into a solid state oxide, which can be reduced back to the original fuel upon recharging without the production of emissions.

Another object of the present invention is to provide an air-metal FCB system which has an energy density in excess of 500 WattHr/Kg and can be miniaturized for portable electronic systems or scaled up for electric vehicles and large stationary power systems.

Another object of the present invention is to provide an air-metal FCB system which includes a subsystem for controlling the flow of oxygen into the porous cathode elements within the power generation head of the system.

Another object of the present invention is to provide an air-metal FCB system which has a discharge voltage of up to 1.2 Volt per cell.

Another object of the present invention is to provide an air-metal FCB system which has the ability to be discharged and recharged simultaneously.

Another object of the present invention is to provide an air-metal FCB system which has the capability of economical recharging.

Another object of the present invention is to provide an air-metal FCB system which has an output power density that is independent of the energy density.

Another object of the present invention is to provide an air-metal FCB system which operates at low temperatures.

Another object of the present invention is to provide an air-metal FCB system which has nearly infinite shelf life.

Another object of the present invention is to provide an air-metal FCB system which has proven cycleability.

Another object of the present invention is to provide an air-metal FCB system which can be designed for small hand-held portable applications as well as for scaled-up applications.

Another object of the present invention is to provide an air-metal FCB system which can be designed for powering electric vehicles, as well as for powering homes, offices, commercial and industrial facilities.

A further object of the present invention is to provide an air-metal FCB system having variable area electrodes and ratios of electrode areas that are also variable.

Another object of the present invention is to provide such an FCB system, in which the energy output of the system is in the range of 500 Whr/Kg and has a fast recharging capabilities.

Another object of the present invention is to provide such a FCB system, in which the discharge/recharge capability, passivation rates, reaction kinetics, and stability and adherence that exhibit significant improvement over prior art battery technologies.

Another object of the present invention is to provide a moving anode type FCB system, in which tape deposited with thin layer of zinc is used as the moving anode of the system.

Another object of the present invention is to provide such a FCB system, in which the zinc film thickness, substrate, conductivity and stability are optimized.

Another object of the present invention is to provide a moving anode-type FCB system, in which the zinc tape anode and electrolyte can be optimized for conductivity, power-density, energy-density, recharge capabilities, system assembly, and system testing (e.g. diagnostics).

Another object of the present invention is to provide a FCB System, in which the metal fuel is realized in the form of discrete metal plates that are fed into a device containing the electrically conductive cathode structure, ionic medium, and anode contacting structures.

Another object of the present invention is to provide such a FCB system, in which metal fuel plates or cards are automatically fed from a stack of metal fuel plates, to provide a system suitable for power generation applications.

Another object of the present invention is to provide such a FCB system, which is adapted for use in power generation applications, while manual feeding could be applicable for portable electronic devices.

Another object of the present invention an FCB system in the form of a card-like device capable of providing enough power to enable at least two-hours of talking time using a conventional cellular phone.

Another object of the present invention is to provide an FCB device for use in powering portable electric devices such as portable computers, cellular phones, camcorders, cassette tape players, etc.

Another object of the present invention is to provide an FCB device for use in powering electric power tools such as lawn mowers, screw drivers, drills, saws, etc.

Another object of the present invention is to provide an FCB device for use in powering transportation vehicles such as passenger vehicles, buses, golf carts, motorcycles, boats, etc.

Another object of the present invention is to provide an FCB device for use in powering stationary systems such as power homes, schools, factories, office buildings, and other distributed generation applications.

These and other objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 2 is a perspective view of a first illustrative embodiment of the rechargeable metal-air FCB system of the present invention, wherein the anode metal fuel is provided in the form of transportable metal tape contained within a cassette-type device that is insertable within a storage bay of a compact power generation unit capable of producing electrical power over a range of output voltages selectable by the user;

FIG. 2A is cross-sectional schematic diagram of the rechargeable metal-air FCB system of FIG. 2, showing (i) anode fuel tape being transported from the supply reel of the system to the take-up reel thereof, (ii) the stationary discharging cathode structure, and (iii) recharging cathode structure of the system, and (iv) the recharging anode structure of the system;

FIG. 2B is a perspective schematic diagram of the rechargeable metalair FCB system of FIG. 2, schematically illustrating the system architecture of the system, including the fuel tape transport subsystem, the stationary cathode and anode structure, the output voltage configuration subsystem, and the system controller;

FIG. 2C1 is a perspective view of the cathode support structure employed in the cassette fuel tape embodiment of FIGS. 2, 2A and 2B, showing five parallel channels within which electrically-conductive cathode strips and electrolyte-impregnated (i.e. ion-impregnated) strips are securely supported;

FIG. 2C2 is a perspective, exploded view of cathode and electrolyte impregnated strips being installed within the support channels of the athode support structure shown in FIG. 2C1;

FIG. 2C3 is a perspective view of the cathode structure of the first illustrative embodiment shown fully assembled;

FIG. 2D1 is a perspective view of a section of the anode fuel tape contained within the cassette fuel cartridge used in the metal-air FCB system of FIG. 2, showing parallel anode strips spatially registered with the cathode strips in the cathode structure (i.e. power generation head) of FIG. 2C3;

FIG. 2E1 is a perspective view of the power generation head of the FCB system of FIG. 2, wherein during the power discharge mode of the system the anode tape within the cassette fuel cartridge is transported past the cathode structure shown in FIG. 2C3, and five anode-contacting elements establish electrical contact with the anode fuel strips as the anode fuel tape passes over the air -pervious cathode structure of the present invention;

FIG. 2C4 is a cross-sectional view of the cathode structure of the FCB system of the first illustrative embodiment, taken along line 2C4—2C4 of FIG. 2C3;

FIG. 2D2 is a cross-sectional view of the anode fuel tape wound on the supply and take-up reels of the fuel cartridge shown in FIGS. 2 and 2A, taken along line 2C4—2C4 of FIG. 2C3;

FIG. 2E2 is a cross-sectional view of the power generation head assembly in the FCB system of the first illustrative embodiment, taken along line 2E2—2E2 of FIG. 2E1, showing the cathode structure of FIG. 2C3 in electrical contact with the anode fuel tape structure of FIG. 2D1;

FIG. 2E3 is a cross-sectional view of the power generation head assembly in the FCB system of the first illustrative embodiment, taken along line 2E3—2E3 of FIG. 2E2;

FIG. 4 is a schematic diagram illustrating the manually-loading type air-metal FCB system of the second illustrative embodiment of the present invention, wherein a metal fuel card is manually loaded into the power generation bay thereof, and the anode structure thereof is maintained in a stationary relationship with respect to the cathode structure of the power generation unit during power generation;

FIG. 5A1 is a perspective view of the cathode support structure employed in the stationary embodiment of FIG. 4, showing five parallel channels for supporting electrically-conductive cathode strips and electrolyte-impregnated strips therewithin;

FIG. 5A2 is a perspective, exploded view of cathode and electrolyte impregnated strips being installed within the support channels of the cathode support structure shown in FIG. 5A1;

FIG. 5A3 is a perspective view of the cathode structure of the second (stationary anode) embodiment of the FCB system shown fully assembled, but detached from the power generation bay thereof;

FIG. 5B1 is a perspective view of a section of an anode fuel card insertable within the power generation unit of the metal-air FCB system of FIG. 4, showing parallel anode strips spatially registered with the cathode strips in the cathode structure (i.e. power generation head) of FIG. 5A3;

FIG. 5C2 is a perspective view of the power generation head assembly of the FCB system of FIG. 4, wherein during the Power Generation Mode of the system the anode tape within the cassette fuel cartridge is transported past the cathode structure shown in FIG. 5B1, and five anode-contacting elements simultaneously establish electrical contact with the anode fuel strips when the anode fuel card is installed within the power generation bay of the system;

FIG. 5A4 is a cross-sectional view of the cathode structure of the FCB system of the second illustrative embodiment, taken along line 5A4—5A4 of FIG. 5A3;

FIG. 5B2 is a cross-sectional view of the anode fuel card designed for use in the power generation unit of the FCB system shown in FIG. 4, taken along line 5B2—5B2 of FIG. 5B1;

FIG. 5C3 is a cross-sectional view of the power generation head assembly in the FCB system of the second illustrative embodiment, taken along line 5C3–53 of FIG. 5C2, showing the cathode structure of FIG. 5A3 in electrical contact with the anode fuel card of FIG. 5B1;

FIG. 5C4 is a cross-sectional view of the power generation head assembly in the FCB system of the second illustrative embodiment, taken along line 5C4—5C4 of FIG. 5C2;

FIG. 6A is a schematic diagram of the air-metal FCB system of FIG. 6, wherein the subsystem structure thereof is schematically illustrated;

FIG. 7A is a perspective view of the cathode support plate used in the FCB system shown in FIG. 6, wherein four cathode receiving recesses are provided for receiving cathode structures and electrolyte-impregnated pads;

FIG. 7A1 is a schematic diagram of a cathode structure insertable within the lower portion of a cathode receiving recess of the cathode support plate shown in FIG. 7A;

FIG. 7A2 is a schematic diagram of an electrolyte-impregnated pad for insertion over a cathode structure within the upper portion of a cathode receiving recess of the cathode support plate shown in FIG. 7A;

FIG. 7B is a perspective view of the anode support structure of the anode fuel cards used in the FCB system of FIG. 6, and having four spatially isolated recesses each being designed to receive a metal anode fuel strip and permit electrical contact with an anode contacting electrode through an aperture formed in the bottom surface of the recess;

FIG. 7B1 is a schematic diagram of a metal anode strip for insertion into a recess of the anode support structure of FIG. 7B;

FIG. 7C is a perspective view of a support plate for supporting a plurality of electrodes designed to establish electrical contact with the anode strips supported within the anode support plate of the FCB system;

DETAILED DESCRIPTION OF THE ILLUSTRATIVE EMBODIMENTS OF THE PRESENT INVENTION

In general, the metal-air fuel cell battery (FCB) of the present invention is based on metal-air chemistry, where the electrically-conductive anode structure can be made of zinc, aluminum, magnesium or beryllium, and the electrically-conductive cathode structure is pervious to oxygen extracted from ambient air. While the preferred embodiment of the FCB system of the present invention uses zinc-air, it is understood that other metals such as aluminum, being lighter, will provide a higher energy density, and that magnesium by virtue of its electrical properties will produce higher voltages than zinc.

Figure 1A:
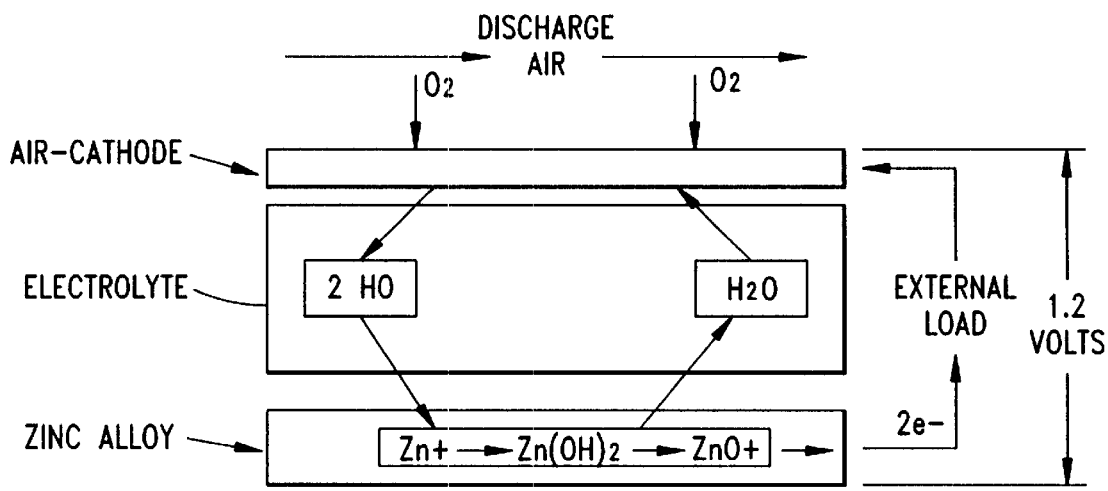
FIG. 1A is a schematic diagram illustrating the physical principles of operation of the metal-air fuel cell battery (FCB) system of the present invention operating in its discharging mode.
Figure 1B:
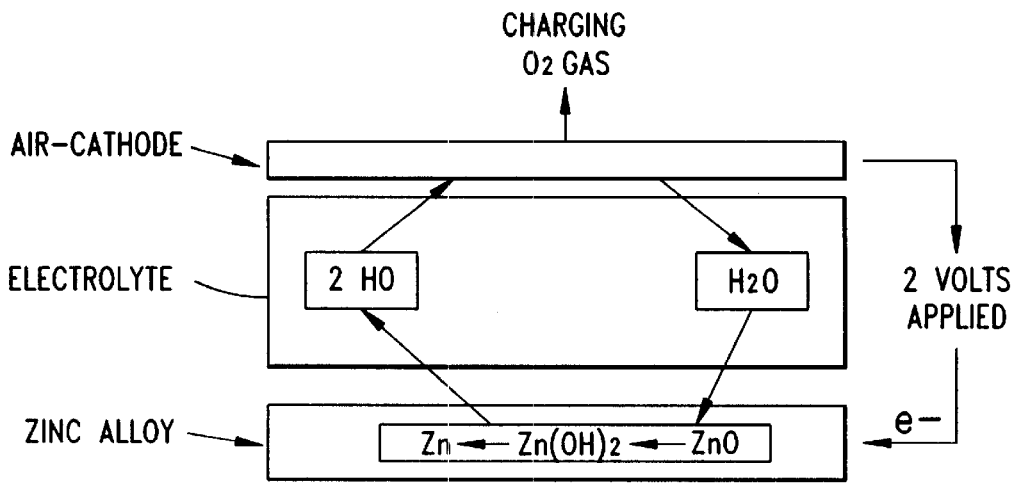
FIG. 1B is a schematic diagram illustrating the physical principles of operation of the metal-air FCB system of the present invention operating in its charging mode.

FIGS. 1A and 1B illustrate the electrochemical principles underlying the operation of the FCB system of the present invention during the discharge and recharge cycles thereof. While such principles are disclosed in U.S. Pat. No. 3,432,354 to Jost, incorporated herein by reference, a brief review of such principles of operation are in order.

During the discharge cycle of the metal-air FCB system, illustrated in FIG. 1A, oxygen O2 is extracted from the air and enters the porous cathode structure, and through the electrolyte (i.e. ionically-conducting) layer the cathode and anode structures, the oxygen combines with the zinc anode to form ZnO+. This chemical reaction produces electricity to drive an external electrical load by releasing two electrons and 1.2 volts.

During the charging cycle of the metal-air FCB system shown in FIG. 1B, the chemical reaction is reversed by connecting an external voltage source (e.g. 2 volts) across the cathode and anode structures. With an appropriate current allowed to flow between the cathode and anode structures, the ZnO anode is reduced back into zinc, while releasing oxygen.

The First Illustrative Embodiment Of The Air-Metal FCB System Of The Present Invention A first illustrative embodiment of the rechargeable metal-air FCB system of the present invention 1 is shown in FIG. 2. As shown, the anode metal fuel in this FCB system is provided in the form of a metal-fuel tape 2 contained within a cassette cartridge device 3. The cassette cartridge device 3 is insertable within a cassette storage bay 4 provided within the housing 5 of the system. This system functionality enables the FCB system to supply electrical power to various types of electrical loads having particular input voltage requirements. The supply of electrical power from the FCB system to a particular electrical load 6 is achieved by connecting the electrical load 6 to the power output terminals 7A, 7B of the system in a conventional manner well known in the art.

In FIG. 2A, the general design of the cassette fuel cartridge 3 is shown. The cartridge device 3 has a housing 8 containing a pair of spaced-apart spindles 9A and 9B about which anodic fuel tape 2 according to the present invention is wound in a manner similar to a video cassette tape. The cartridge also includes a pair of spaced apart tape guiding rollers 10A and 10B mounted in the front corners of the cassette housing. The front end portion 3A (i.e. side wall and top surface) of the cassette housing has an opening 11 formed therein. Housing opening 11 serves a number of important functions, namely: it allows the "multi-track" discharging head (i.e. power generation head) 12 of the system to be moved into properly aligned position with respect to the fuel tape 2 during power generation; it allows the power generation (i.e. discharging) head 12 to be moved away from the fuel tape when the cassette cartridge 3 is removed from the storage bay 4; it allows the metal-oxide sensing head 13 and "multi-track" oxide-reducing (i.e. reconditioning) head 14 to be moved into properly aligned position with respect to the oxidized fuel tape during recharging operations; and it allows the metal-oxide sensing head 13 and metal-oxide reducing head 14 to be removed from the fuel tape when the cassette cartridge is to be removed from the cassette storage bay 4. A retractable window or door 15 is mounted over this opening 11 in order to close off the cassette interior from the environment when the device is not installed within the cassette storage bay 4 of the system. Various types of spring-biased mechanisms can be used to realize the retractable window of the cassette cartridge of the present invention. While not shown, tape-tensioning mechanisms may also be included within the cassette housing 8 to ensure that the metal-fuel tape maintains proper tension during winding and rewinding operations. The cassette housing 8 can be made from any suitable material designed to withstand heat and corrosion. Preferably, the housing material is electrically non-conducting to provide an added measure of user-safety during power generation and tape reconditioning operations within the system.

In the illustrative embodiment, the metal-fuel tape of the present invention is "multi-tracked" in order to enable the simultaneous production of multiple supply voltages (e.g. 1.2 Volts) from the "multitrack" power discharging head 12. As will be described in greater detail hereinafter, the purpose of this novel power generation head design is to enable the generation and delivery of a wide range of output voltages {V1, V2, . . . , Vn} selectable by the user, suitable to electrical load 6 connected to output power terminals 7A, 7B of the FCB system.

The FCB system of the first illustrative embodiment has several modes of operation, namely: a Cassette Cartridge Loading Mode during which the cassette cartridge is loaded within the system; a Power Generation Mode during which electrical power is produced from the output terminal of the system and supplied to the electrical loaded connected thereto; a Quiescent Mode during which no electrical power is supplied to an electrical load connected to the system; a Metal-Fuel Tape Reconditioning Mode during which the metal-fuel tape within the cartridge is reconditioned within the system (without power being supplied to an electrical load); and a Cassette Cartridge Unloading Mode during which the cassette cartridge is unloaded from the system.

In order carry out such modes of system operation, the FCB of the first illustrative embodiment is provided with a number of subsystems, as schematically illustrated in FIG. 2A, namely: a cassette cartridge loading/unloading subsystem 15 for loading and unloading of a cassette fuel tape in to the FCB system during the Cassette Cartridge Loading And Unloading Modes of operation, respectively; a metal-fuel tape transport subsystem 16 for transporting the metal-fuel tape within the system during the Power Generation Mode of operation; a power generation subsystem 17 for generating electrical power from the metal-fuel tape during the Power Generation Mode of operation; a tape reconditioning subsystem 18 for reconditioning (i.e. reducing) oxidized metal fuel tape within a cassette cartridge during the Metal-Fuel Tape Reconditioning Mode of operation; an output voltage control subsystem 19 for controlling the output voltage produced at the output power terminals 7A, 7B during the Power Generation Mode of operation; a power generation head transport subsystem 20 for transporting the power generation head of the system into "ionically-conductive" contact with the metal-fuel tape within the cassette cartridge during the Power Generation and Quiescent Modes of operation; a metal-oxide sensinglreducing head transport subsystem 21 for transporting the metal-oxide sensing head 13 and the metal-oxide reducing head 14 into "ionically-conductive" contact with the metal-fuel tape within the cassette cartridge during the Metal-Fuel Tape Reconditioning Mode of operation; an output power control subsystem 22 for controlling the power output produced across the connected electrical load during the Power Generation Mode of operation; and a system controller 23 for cooperating with and managing the operation of the individual subsystems identified above during the various mode of operation of the FCB system. Details concerning each of these subsystems and how the cooperate will be described below.

The Cassette Cartridge Loading/Unloading Subsystem

As best illustrated in FIGS. 2, 2A and 2B, the Cassette Cartridge Loading/Unloading Transport Subsystem 15 of the first illustrative embodiment comprises: a cassette receiving mechanism 24 for automatically receiving the cassette cartridge 3 at the cassette insertion port 4A formed in the front panel of the system housing 5, and withdrawing the cartridge into the cassette storage bay 4 therewithin; an automatic door opening mechanism 25 for opening the door 11A of the cassette cartridge when the cartridge is received within the storage bay of the system; and an automatic cassette ejection mechanism 26 for ejecting the cassette cartridge from the cassette storage bay 4 through the cassette insertion port in response to the depression of an "ejection" button 27 provided on the front panel of the system housing.

In the illustrative embodiment, the cassette receiving mechanism 24 can be realized as a platform-like carriage structure that surrounds the exterior of the cassette cartridge housing. The platform-like carriage structure 28 can be supported on a pair of parallel rails, by way of rollers, and translatable therealong by way of an electric motor and cam mechanism, operably connected to the system controller. The function of the cam mechanism is to convert rotational movement of the motor shaft into a rectilinear motion necessary for translating the platform-like carriage structure along the rails when a cassette is inserted within the platform-like carriage structure. A proximity sensor, mounted within the system housing, can be used to detect the presence of the cassette cartridge being inserted through the insertion port 4A and placed within the platform-like carriage structure. The signal produced from the proximity sensor can be provided to the system controller in order to initiate the cassette cartridge withdrawal process in an automated manner.

With the system housing, the automatic door opening mechanism 25 can be realized by any suitable mechanism that can slide the cassette door 11A into its open position when the cassette cartridge is completely withdrawn into the cassette storage bay. In the illustrative embodiment, the automatic cassette ejection mechanism 26 employs same basis structure and functionalities of the cassette receiving mechanism 24. The primary difference is the automatic cassette ejection mechanism responds to the depression of an "ejection" button 27 provided on the front panel of the system housing. When the button is depressed, the mode of the system is switched to the Cassette Unloading Mode of operation (i.e. The power generation and other heads moved away from the metal-fuel tape), and the cassette cartridge is automatically ejected from the cassette storage bay 4, through the cassette insertion port.

The Metal-Fuel Tape Transport Subsystem

In the illustrative embodiment, the metal-fuel tape transport subsystem 16 comprises a number of subcomponents, namely a pair of synchronized electric motors 31A and 31B, shown in FIG. 2B, for controlled engagement with the spindles 10A and 10B of the fuel cartridge 3 when the cartridge is inserted in the storage bay 4 of the system, and driving the spindles under synchronous control during the Power Generation Mode as well as Tape Reconditioning (Recharging) Mode; an electrical drive circuit 32 for producing electrical drive signals for the electric motors 31A and 31B; and a speed control circuit 33 for sensing the speed of the metal-fuel tape (i.e. motors) and producing signals for controlling the electric drive circuits so that the desired tape speed is accomplished. Notably, speed control circuit 33 can be designed to cooperate with the system controller 23 during the various modes of system operation described hereinabove.

The Power Generation Subsystem

Referring to FIGS. 2C1 through 3, the power generation subsystem 17' of the second illustrative embodiment comprises: a multi-track power generation head assembly 12 having a multi-element cathode and anode structure; a power head transport subsystem 20' for transporting the subcomponents of the power generation head assembly 12; and the system controller 23' for managing the operation of the above-described subsystems. Such subsystems will be described in greater technical detail below.

In the illustrative embodiment, the power generation head assembly 12 comprises a number of subcomponents, namely: a cathode element support plate 34 having a plurality of isolated channels 35 permitting the free passage of oxygen (O2) through the bottom portion of each such channel; a plurality of electrically-conductive cathode elements (e.g. strips) 36 for insertion within the lower portion of these channels, respectively; a plurality of electrolyte-impregnated strips 37 for placement over the cathode strips 36, and support within the channels 35, respectively, as shown in FIG. 2C2; and an air-throttling panel 79' slidably mounted over the upper (back) surface of the cathode element support plate 34', with its relative position being controlled by linear motor 80' under the control of system controller 24'. In the illustrative embodiment, electrolyte-impregnated strips are realized by impregnating an electrolyte-absorbing carrier medium with a gel-type electrolyte. Preferably, the electrolyte-absorbing carrier strip is realized as a strip of low-density, open-cell foam material made from PET plastic. The gelelectrolyte for each power generating cell is made from a formula consisting of an alkali solution, a gelatin material, water, and additives known in the art.

In the illustrative embodiment each cathode strip is made from a sheet of nickel wire mesh 38 coated with porous carbon material and granulated platinum or other catalysts 39 to form a cathode suitable for use in metal-air FCB systems. Details of cathode construction are disclosed in U.S. Pat. Nos. 4,894,296 and 4,129,633, incorporated herein by reference. To form a current collection pathway, an electrical conductor 40 is soldered to the underlying wire mesh sheet of each cathode strip. As shown in FIG. 2C2 each electrical conductor 40 is passed through a hole 41 formed in the bottom surface of a channel 35 of the cathode support plate, and is connected to the output voltage control subsystem 19. As shown, the cathode strip pressed into the lower portion of the channel to secure the same therein. As shown in FIGS. 2C2 and 2C3, the bottom surface 42 of each channel 35 has numerous perforations 43 formed therein to allow the free passage of oxygen therethrough to the cathode strip (at atmospheric temperature and pressure). In the illustrative embodiment, an electrolyte-impregnated strip 37 is placed over a cathode strip 36 and is secured within the upper portion of the cathode supporting channel 35. As shown in FIG. 2C3, when the cathode strip and thin electrolyte strip are mounted in their respective channel in the cathode support plate, the outer surface of the electrolyte-impregnated strip is disposed flush with the upper surface of the plate defining the channels.

By its nature, the carbon material constituting the cathode elements is hydrophobic and thus repels water from the oxygen-pervious cathode elements. To ensure the expulsion of water within electrolyte-impregnated strips 37 and thus optimum oxygen transport across the cathode strips, the interior surfaces 44 of the cathode support channels are coated with a hydrophobic film (e.g. Teflon) 45. Preferably, the cathode support plate is made from an electrically non-conductive material, such as polyvinyl chloride (PVC) plastic material well known in the art. The cathode support plate can be fabricated using injection molding technology also well known in the art.

The structure of the multi-tracked fuel tape contained within the cassette fuel cartridge of FIG. 2 is illustrated in FIG. 2D1. As shown, the metal fuel tape comprises: an electrically non-conductive base layer 48 of flexible construction; a plurality of parallel extending, spatially separated strips of metal (e.g. zinc fuel) 49A, 49B, 49C, 49D and 49E disposed upon the base layer; a plurality of electrically non-conductive strips 50A, 50B, 50C, 50D and 50E disposed upon the base layer, between pairs of fuel strips 49A, 49B, 49C, 49D and 49E; and a plurality of parallel extending channels (e.g. grooves) 51A, 51B, 51B, 51D and 51E formed in the underside of the base layer, opposite the metal fuel strips thereabove, for allowing electrical contact with the metal fuel tracks 49A, 49B, 49C, 49D and 49E through the grooved base layer. Notably, the spacing and width of each metal fuel strip is designed so that it is spatially registered with a corresponding cathode strip in the power generation head of the system in which the fuel tape is intended to be used. The metal fuel tape described above can be made by laminating zinc strips onto a layer of base material in the form of tape. The metal strips can be physically spaced apart, or separated by Teflon, in order to ensure electrical isolation therebetween. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel tape can be polished to remove any electrical insulation material from the surface of the metal fuel strips which are to come in contact with the cathode structures during power generation.

In FIG. 2E1, an exemplary metal-fuel (anode) contacting structure 52 is disclosed for use with the multi-tracked fuel tape of the present invention. As shown, a plurality of electrically conductive elements 53A, 53B, 53C, 53D, and 53E are supported from an platform 54 disposed adjacent the travel of the fuel tape within the cassette cartridge. Each conductive element 53A through 53E has a smooth surface adapted for slidable engagement with one track of metal fuel through the fine groove formed in the base layer of the fuel tape. Each conductive element is connected to an electrical conductor 55A (through 55E) which is connected to the output voltage control subsystem 19. The platform 54 is operably associated with the power generation head transport subsystem 20 and can be designed to be moved into position with the fuel tape during the Power Generation Mode of the system, under the control of the system controller 23.

As shown in FIGS. 2B and 3, metal-oxide sensing head 13 comprises: a positive electrode support structure 57 for supporting a plurality of positively electrode elements 58A, 58B, 58C, 58D and 58E, each in registration with the upper surface of one of the fuel tracks (that may have been oxidized) and connected to a low voltage power supply terminal 59A, 59B, 59C, 59D and 59E provided by current sensing circuitry 60; and a negative electrode support structure 61 for supporting a plurality of negatively electrode elements 62A, 62B, 62C, 62D and 62E, each in registration with the lower surface of the fuel tracks and connected to a low voltage power supply terminal 63A, 63B, 63C, 63D and 63E provided by current sensing circuitry 60. With this arrangement, the system is capable of determining which portions of which fuel tracks require reconditioning during the reconditioning mode of operation. Such intelligent reconditioning can be carried out by the current sensing circuitry 60 automatically applying a test voltage across a fuel track during this mode, measuring its response current and comparing it against a threshold current value stored within the memory of the system controller. If the system controller 23 determines that the response current along a particular section of fuel track falls below the predetermined threshold (i.e. indicating the presence of a high electrical resistance through the fuel track and thus likelihood of oxidation therealong), then the system controller automatically causes the tape reconditioning subsystem 18 to apply a reconditioning voltage across that particular track under the control of the system controller. If and when the electrical resistance along any portion of a fuel track is acceptable, then the system controller automatically removes the reconditioning voltage from across that particular track, thereby conserving electrical energy during the tape reconditioning mode of operation.

The Power Generation Head Transport Subsystem

As best illustrated in FIG. 2B, power generation head transport subsystem 20 of the first illustrative embodiment comprises: a translation mechanism 64A for moving the cathode support structure 34 into proper position with respect to the fuel tape during Power Generation Mode; and a second translation mechanism 64A for moving the anode contacting element support structure 52 into proper position with respect to the fuel tape during the Power Generation Mode. Preferably, each of these subsystems is operated under the control of the system controller 23. Electric motors and cam mechanisms can be used to realize these mechanisms. During the Power Generation Mode of the system, the shafts of the electric motors are rotated, and by virtue of the cam mechanisms, the cathode support structure and anode (i.e. metal-fuel) contacting support structure are both transported relative to the multi-track fuel tape so that the cathode elements establish ionic contact with the upper surface of the fuel tape, while the lower surface of the fuel tape establishes electrical contact with the anode contacting elements of the power generation head 12. While all of the cathode elements will establish ionic contact with the corresponding metal-fuel strips as the fuel tape is transported over the power generation head by way of the tape transport mechanism, electricity will only be produced from those metalfuel tracks that have been configured into the system by output voltage control subsystem 19.

In alternative embodiments of the present invention, either the cathode support structure or anode contacting support structure can be maintained stationary with respect to the system housing, while the other (cathode or anode contacting) support structure is translatable relative to the loaded fuel tape.

Output Voltage Control Subsystem

In the first illustrative embodiment of the present invention, the output voltage control subsystem 19 of the FCB system hereof comprises a number of subsystem components, namely: a load sensing circuit 65, operably connected to the output power terminals 7A, 7B, for automatically sensing the output voltage requirements for any electrical load connected 6 thereto, and producing an input signal to the system controller 23 indicative of the nature and magnitude of the connected load; and an output terminal configuration mechanism 66, responsive to the system controller 23, for automatically configuring the output voltage terminals produced by selected fuel tracks (e.g. cells) of the fuel tape in order to produce the required output voltage across the electrical load connected to the system.

In the illustrative embodiment, output voltage terminal configuration mechanism 66 can be realized as an electricallyprogrammable power switching circuit using transistor-controlled technology, in which five pairs of power supplying electrodes (derived from the five fuel tracks along the fuel tape) are connected in either an electrically serial or parallel manner in order to produce different discrete values of output voltage to meet the requirements of the electrical load connected to the power output terminals of the system. In the case of zinc fuel material, the output voltage from each fuel track (e.g. Cell) is 1.2 Volts. For a five-track FCB system, a 6.0 Volt power supply can be produced from the system by configuring the electrode pairs (from the fuel tracks) in electrical series configuration, in a manner well known in the art. Lower voltage power supplies can be configured by configuring one or more of the fuel cells in parallel configuration with other cells. Higher voltages can be produced using power conversion circuitry, in which regulated DC voltage power signals are chopped using switching circuits, harmonically filtered, transformed to higher voltages using inductors, rectified, and low-pass filtered in a manner well known in the regulated power supply art.

The Tape Reconditioning Subsystem

Figure 3A:
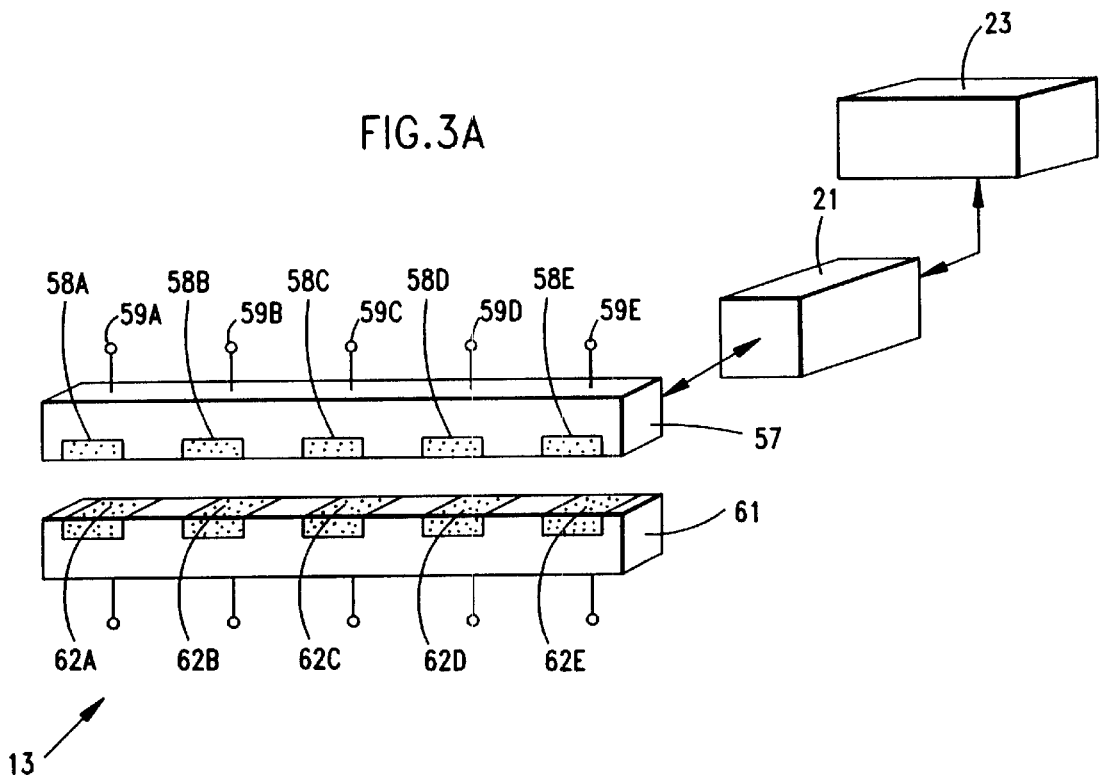
FIG. 3A is a perspective view of the multi-track oxide sensing head employed in the FCB system of FIG. 2, for sensing which fuel tracks have been discharged (i.e. Oxidized) and need to be recharged (i.e. Reduced)
Figure 3B:
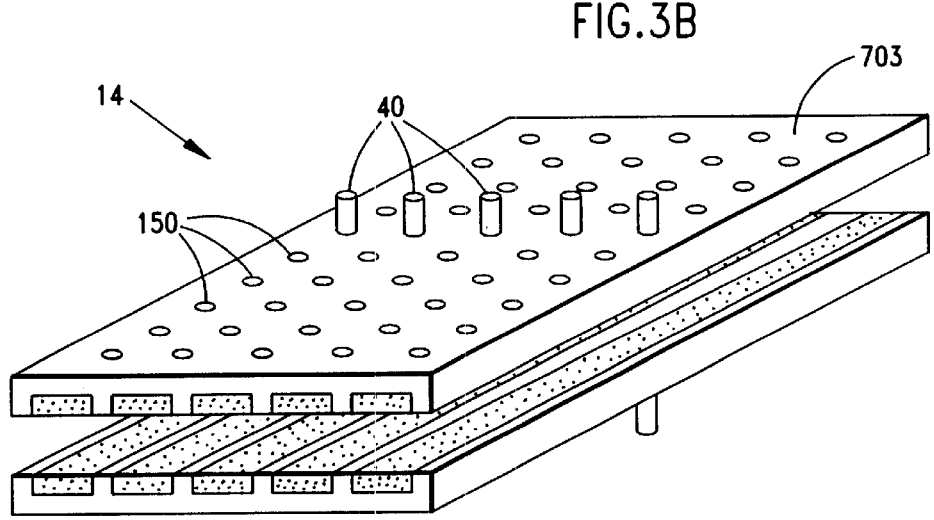
FIG. 3B is a perspective view of the multi-track oxide reducing head employed in the FCB system of FIG. 2, for reducing fuel tracks have been oxidized.

As best illustrated in FIGS. 2B and 3B, the tape reconditioning (i.e. recharging) subsystem 18 of the first illustrative embodiment comprises: metal-oxide sensing head 13 disposed downstream from the power generation head 12; reconditioning (i.e. reducing) head 14; current sensing circuit 60 operably connected to the oxide sensing head 13; and regulated power supply circuitry 72 responsive to the system controller. In the illustrative embodiment, the metal-oxide sensing head 13 has multiple oxide sensing cells 69 for sensing which portions of which tracks have been oxidized during previous power generation cycles. This function is carried out by applying a voltage across each such fuel track and sensing the response current through the tape.

In the illustrative embodiment, the reconditioning (i.e. reducing) head 14 comprises: a multi-element cathode structure 70; and a multi-element anode contacing structure 71 in registration therewith. Preferably, the design of multi-element cathode structure 70 is similar to design of the cathode structure employed in the power generation head 12 describe above. Also, the design of multi-element anode contacting structure 71 is similar to design of the cathode structure employed in the power generation head 12, as shown in FIG. 2E1. The primary difference would be the relative size of these structures, namely: the cathode and anode-contacting structures in the oxide-reducing head should be substantially greater than the size of the cathode and anode-contacting structures in the power generation head. This will improve the recharging characteristics of the system, as taught in Applicant's U.S. Pat. No. 5,250,370, incorporated herein by reference.

The function of the multi-track oxide reducing head 14 is to reduce oxidized portions of the multi-track fuel tape consumed during power generation operations. The function of the current sensing circuit 60 is to sense (in real-time) the current levels produced across the individual fuel tracks (in response to applied voltages) during recharging operations, in order to determine which portions of which fuel tracks have been oxidized and need to be recharged by the multi-track recharging head of the system. The function of the regulated power supply circuitry 72 is to receive as input, standard alternating current (AC) electrical power (e.g. at 120 Volts) through an insulated power cord 73, and to convert such electrical power into regulated direct current (DC) electrical power at a regulated voltage and current. Preferably, the regulated voltages and currents are selected so that the oxidized fuel tracks can be optimally reconditioned (i.e. reduced) during the Recharging Mode Of Operation of the system, for reuse of the fuel tape.

The Metal-Oxide Sensing/Reducing Head Transport Subsystem

As best illustrated in FIGS. 2B and 3A, the metal-oxide sensing/reducing head transport subsystem 21 of the first illustrative embodiment comprises: a transport mechanism for moving the array of metal-oxide sensing heads 13 and the array of metal-oxide reducing heads 14 into proper position with respect to the metal-fuel tape 2 during the Tape Reconditioning Mode of operation. In the illustrative embodiment, this mechanism transports platform 57 and 61 (supporting the electrodes of the metal-oxide sensing and reducing cells) using a motor and a cam mechanism operated under the guidance of the system controller.

During the Tape Reconditioning Mode of operation, the electrodes of the metal-oxide sensing and reducing cells are both moved in position with respect to the multi-track fuel tape by the transport subsystem 21 while the fuel tape is transported through the power generation head of the FCB system by way of the tape transport subsystem 16 described hereinabove. While all of the electrodes of the array of metal-oxide reducing cells 13 establish physical contact with the corresponding metal-fuel strips as the fuel tape is being transported from spindle to spindle, electrical power will only be supplied to those fuel tracks that have been determined to have sufficient metal oxide formation by the metal oxide sensing, heads.

The Output Power Control Subsystem

In the first illustrative embodiment of the present invention, the output power control subsystem 22 comprises: an air flow management subsystem 74; pO2 sensing subsystem 75; metal-fuel tape speed control subsystem 33; and system controller 23.

In a preferred embodiment of the above-described moving-anode type of air-metal FCB system, the main purpose of the output power control subsystem 22 is to regulate the output power produced across an electrical load connected to the power output terminals of the system shown in FIG. 2. In the illustrative embodiment, this function is carried out by controlling: the velocity of the metal-fuel tape past the relatively stationary power generation head (i.e. cathode structure); and/or the flow of oxygen into the cathode structure of the power generation head of the system. In order to achieve these functions, the output power control subsystem 22 hereof comprises a number of subordinate subsystems, namely: tape speed control subsystem 33; an oxygen pressure (PO2) control subsystem 74; air-flow management subsystem 75; an output current sensing circuitry 76; output voltage sensing circuitry 77; and system controller 23.

Tape speed control subsystem 33 is provided between the electrical motors 31A and 31B of the fuel tape transport subsystem and the internal power supply 63 used to drive these motors and the electrical circuitry employed within the system. The oxygen pressure (PO2) control subsystem 74 is embedded about the power generation head 12. In turn, both the motor speed control circuit 33 and the PO2 control subsystem 74 are controlled by the system controller 23. The function of the tape speed control subsystem 33 is to control (increase or decrease) the speed of the fuel tape relative to the power generation head by way of controlling the speed of electric motors 31A and 31B. The function of PO2 control subsystem 74 is to monitor the amount of $O_2$ present within each porous cathode element in the power generation head using PO2 sensors 78 embedded therein, as shown in FIG. 2C2. In response to the measured PO2 level, the PO2 control subsystem controls the amount of $O_2$ within the power generation head by controlling the flow of air through the rear surface of the cathode support plate 34 by way of air flow management subsystem 75. In the illustrative embodiment, air flow management subsystem 75 is realized using a motor-controlled throttling panel 79 disposed over cathode support plate 34 and transportable by electric motor 80 under the control of system controller 23. As shown in FIG. 2E1, throttling plate 79 has air flow apertures 150 which can be made to partially or completely register with the air apertures 43 formed in the cathode element support plate 34.

In general, output power control subsystem above-described may operated in several different ways in order to achieve output power control, that is: (1) by controlling only the fuel tape speed; (2) by only controlling oxygen flow into the cathode structure; and (3) by controlling both the fuel tape speed across the power generation head and oxygen flow into the cathode structure. Preferably, however, the best degree of output power control will be achieved by controlling both the fuel tape speed across the power generation head and the flow of oxygen flow into the cathode structure. This approach will be considered below.

During the power generation mode of the system, the system controller 23 monitors the output current into and output voltage across the electrical load connected to the system. These parameters are measured in real-time using output current sensing circuitry 76 and output voltage sensing circuitry 77, respectively, shown in FIG. 2A. Also, the system controller 23 monitors on a real-time basis the partial oxygen pressure (PO2) within the cathode structure using a PO2 sensor 78 embedded within the cathode support plate 34, as illustrated in FIG. 2C3. A power output threshold Pout and a partial oxygen pressure threshold PO2 are set within the program storage memory (e.g. EPROM) associated with the system controller. During power generation, the system controller compares the measured output current and voltage (i.e. power output) against the power output threshold and PO2 threshold, and based on the comparison, sends appropriate control signals to the motor speed control circuit 33 and motor-controlled air throttling plate 79. In response thereto, these control signals increase or decrease the speed of the fuel tape through the power generation head and increase or decrease the flow of air through the cathode support plate 34 so that the actual measured power output across the electrical load is substantially equal to the power output value set in the program memory of the system controller. Conventional control theory can be used in order to achieve and optimize such desired control functions in an efficient manner.

In the illustrative embodiment of the present invention, air-flow management subsystem 75 also includes a variable-speed electric fan 81 operably connected to the system controller, to force ambient air over the rear surface of the air-throttling plate 79 and cathode element support structure 34 so that oxygen-rich air is continually supplied to the airpervious cathode elements contained therein. The speed of electric fan 81 is controlled by the system controller in response output power requirements, humidity conditions sensed by humidity sensors 82 mounted within the interior of the system housing, and/or other conditions preprogrammed into the system controller. In such instances, the function of the humidity sensor 82 would be to determine when the relative humidity therein drops below a predetermined threshold value set in memory within system controller 23. A moisture control mechanism can be provided to increase the relative humidity to ensure that the electrolyte (i.e. ionic medium) within electrolyte-impregnated strips 37 is optimally managed under by the system controller.

The System Controller

In the preferred embodiment of the FCB system of FIG. 2, the system controller 23 is realized using a programmed microcontroller having program and data storage memory and a system bus structure well known in the microcomputing and control arts. Each of the subsystems of the system are in communication with the system controller through the system bus. During the power generation mode of operation, the microcontroller produces controls signals for controlling the speed of the tape drive motors 31A and 31B and the operation of the output voltage configuration subsystem 66, and thus ensures that the electrical power is supplied to the connected load at the required output voltage. Notably, the output voltage supplied to the electrical load connected to the system will determine which fuel tracks are oxidized during the power generation mode of the system. Thus, in a five fuel-track tape system with a particular electrical load, it is possible that not all of the five fuel tracks will be oxidized (i.e. Consumed) during power generation and delivery. In such cases, the system controller produces control signals for optimally controlling the operation of the tape conditioning subsystem so that only those fuel tracks (or portions thereof) that have been optimized are electrically reduced during the Tape Reconditioning Mode of the system. This ensures that minimal electrical power is consumed during tape reconditioning operations, substantially improving the efficiency of the system. Details pertaining to this aspect of the present invention will be described in greater detail hereinafter.

Figure 4A:
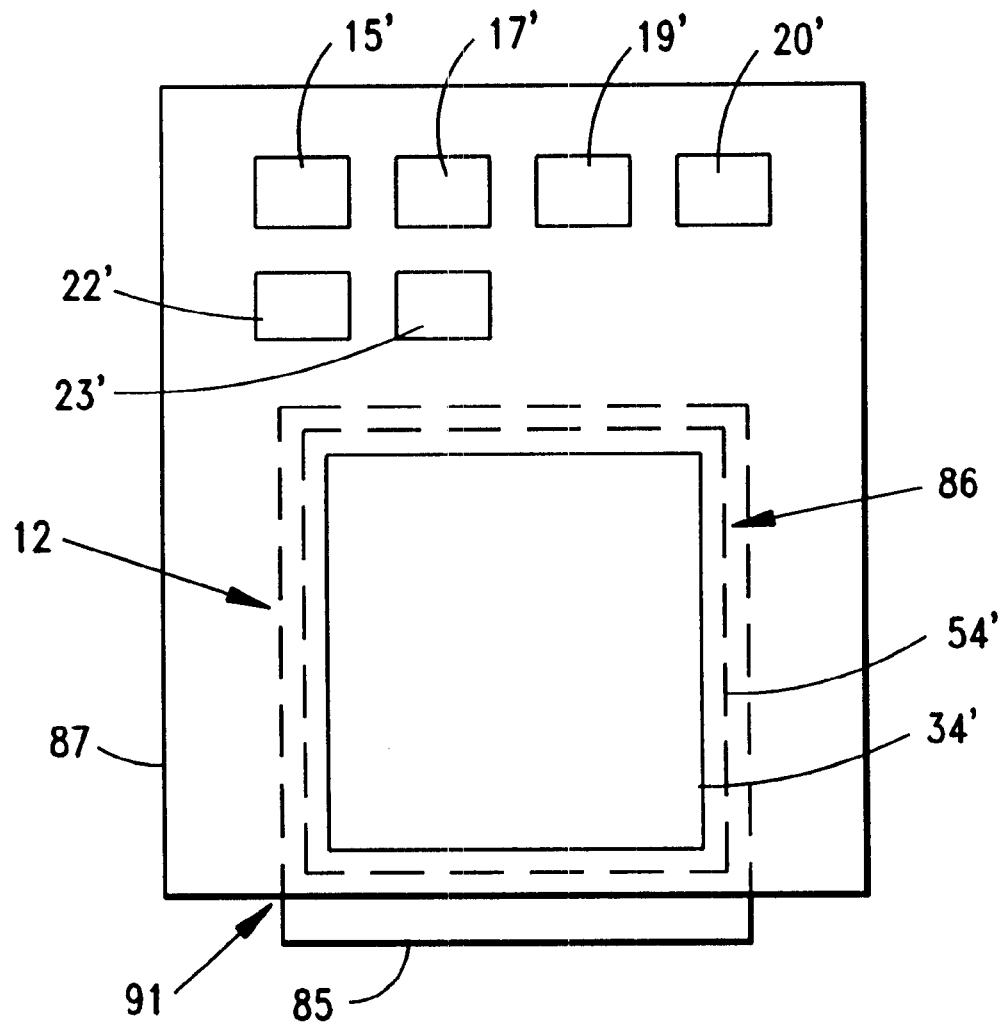
FIG. 4A is a schematic diagram of the Fcb system of FIG. 4 showing its subsystem structure thereof.
Figure 4B:
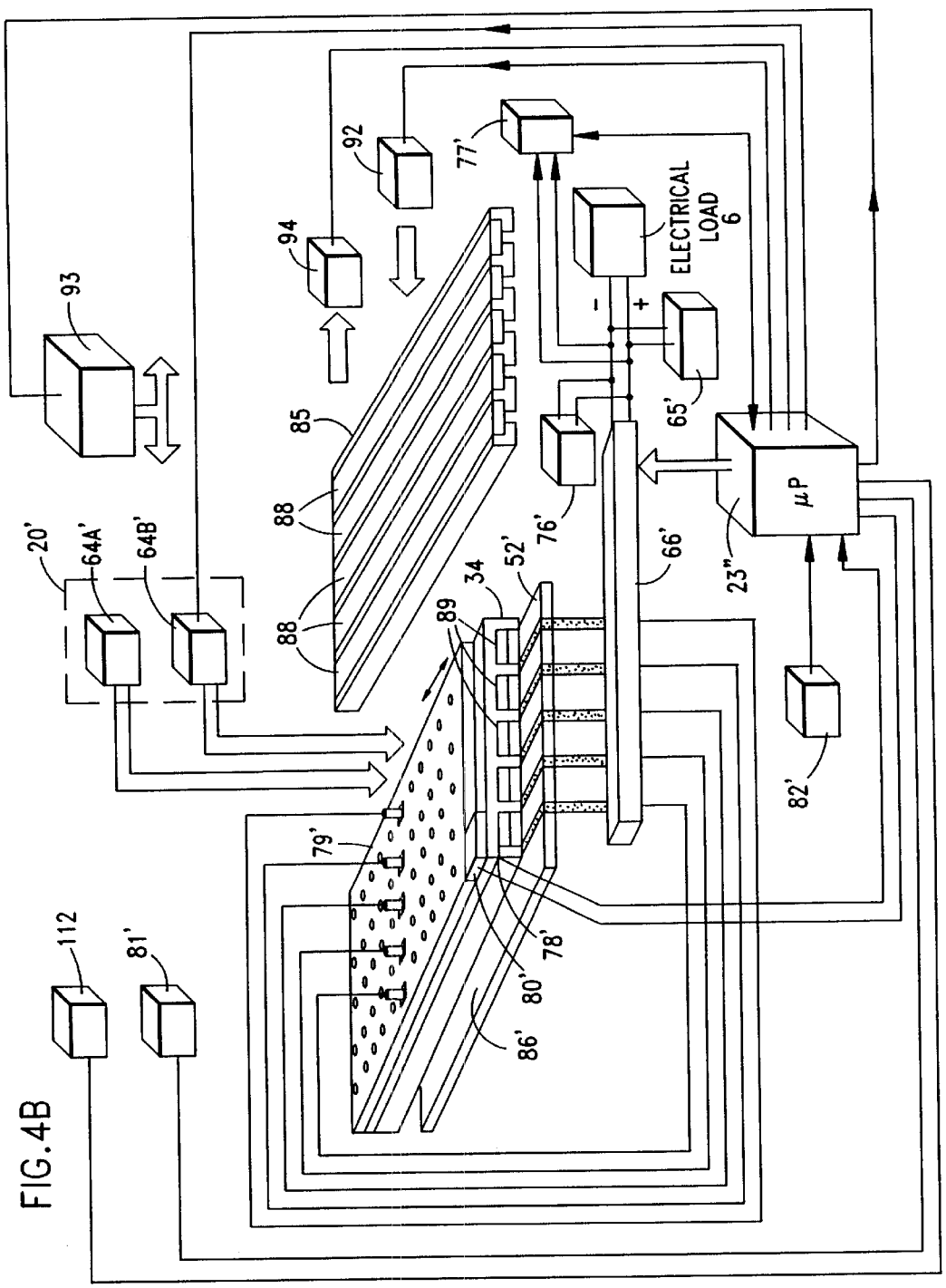
FIG. 4B is a schematic diagram of the metal-air FCB system of FIG. 4, showing in greater detail the subcomponents of the subsystems.

The Second Illustrative Embodiment Of The Air-Metal FCB System Of The Present Invention A second illustrative embodiment of the rechargeable metal-air FCB system of the present invention is shown in FIG. 4. As shown, the metal fuel is provided in the form of a metal fuel card 85 which is manually loaded into the card storage bay 86 of the system. As shown in FIGS. 4 and 4B, the fuel card 85 has a rectangular-shaped housing containing a plurality of electrically isolated metal-fuel strips 88 adapted to contact the cathode elements 89 of the "multi-track" power generation head 12' in the system when the fuel card is moved into properly aligned position between cathode support plate 34' and anode contacting structure 52' during the Power Generation Mode.

In the illustrative embodiment, the fuel card of the present invention is "multi-tracked" in order to enable the simultaneous production of multiple supply voltages (e.g. 1.2 Volts) from the "multitrack" power generation head 12'. As will be described in greater detail hereinafter, the purpose of this novel generation head design is to enable the generation and delivery of a wide range of output voltages from the system, suitable to the electrical load 6 connected to the FCB system.

The FCB system of the second illustrative embodiment has several modes of operation, namely: a Card Loading Mode during which a fuel card 85 is loaded within the system; a Power Generation Mode during which electrical power is produced from the output terminal of the system and supplied to the electrical loaded connected thereto; a Quiescent Mode during which no electrical power is supplied to an electrical load connected to the system; and a Card Unloading Mode during which the fuel card is unloaded from the system.

In order to carry out such modes of system operation, the FCB of the second illustrative embodiment is provided with a number of subsystems, as schematically illustrated in FIG. 4A, namely: a fuel card loading/unloading subsystem 15' for loading and unloading of a fuel card in to the FCB system during the Card Loading And Unloading Modes of operation, respectively; a power generation subsystem 17' for generating electrical power from the metal-fuel during the Power Generation Mode of operation; an output voltage control subsystem 19' for controlling the output voltage produced at the output power terminals 7A, 7B during the Power Generation Mode of operation; a power generation head transport subsystem 20' for transporting the power generation head of the system into "ionically-conductive" contact with the metal-fuel within the fuel card during the Power Generation and Quiescent Modes of operation; an output power control subsystem 22' for controlling the power output produced across the connected electrical load during the Power Generation Mode of operation; and a system controller 23' for cooperating with and managing the operation of the individual subsystems identified above during the various mode of operation of the FCB system. Details concerning each of these subsystems and how they cooperate will be described below.

The Fuel Card Loading/Unloading Subsystem

As illustrated in FIGS. 4 and 4A, the Fuel Card Loading/Unloading Transport Subsystem 15' of the second illustrative embodiment comprises: a card receiving mechanism 92 for automatically receiving a metal-fuel card 85 at the fuel card insertion/ejection port 91 formed in the front panel of the system housing, and withdrawing the fuel card into the fuel card storage bay 86 therewithin; (optionally, an automatic cover sliding mechanism 93 for slidably a fuel covering panel away from the metal-fuel strips contained with the fuel card when the fuel card is received within the storage bay of the system); and an automatic fuel card ejection mechanism 94 for automatically ejecting loaded fuel card 85 from the card storage bay 86 through the fuel card insertion/ejection port in response to the depression of an "ejection" button 95 provided on the front panel of the system housing.

In the second illustrative embodiment, the card receiving mechanism 92 is realized as a port integrated with the system housing, that permits the fuel card to be inserted within the card storage bay, in a manner similar to a conventional (Type II or III) PCMCIA. A proximity sensor, mounted within the system housing, can be used to detect the presence of the fuel card being inserted within the card storage bay 86. The signal produced from the proximity sensor can be provided to the system controller in order to initiate the Quiescent Mode of operation in an automated manner.

Entering the Power Generation Mode can be accomplished can be achieved in a variety of different ways, depending on the particular application at hand. In a portable electronic device, such as cellular or radio telephone, portable computer, or other electronic appliance, insertion of the fuel card into the card storage bay can be sufficient to enter the system into the Power Generation Mode, in which case, other system control functions will serve to manage the utilization of electronic power on an as needed basis. In some applications, it will make sense to embody power conservation control functionality within the resultant system in which the FCB (subsystem) hereof is embodied.

Within the system housing, the optional automatic cover opening mechanism 93 can be realized by any suitable mechanism that can slides the fuel covering panel (slidably disposed over anodic fuel strips of the fuel card) into its open position (away from the fuel strips) when the fuel card is completely withdrawn into the card storage bay. In the illustrative embodiment, the automatic card ejection mechanism 94 employs same basis structure and functionalities of the card receiving mechanism 92. The primary difference is the automatic card ejection mechanism 94 responds to the system controller 23 determining that the loaded fuel card is exhausted of fuel, as well as the depression of "ejection" button 95 by the operator of the system. When the button 95 is depressed, the mode of the system is switched to the Card Unloading Mode of operation (i.e. the power generation and other heads moved away from the metal-fuel tape), and the card is automatically ejected from the card storage bay 86, through the card insertion/ejection port 91.

The Power Generation Subsystem

As best illustrated in FIG. 4B, power generation subsystem 17 of the second illustrative embodiment comprises: a power generation (i.e. discharging) head 12' having a multi-element cathode structure and a multi-element anode contacting structure in registration therewith; a power generation-head transport mechanism 20' for moving the power generation head 12' into proper position with respect to the fuel card during the Power Generation Mode; and the system controller 23' for managing the subsystems associated with the power generation subsystem 20'.

Referring to FIGS. 5A1 through 5C4, the multi-track power generation head assembly 12' employed in the system of FIG. 4 will be described in greater technical detail. In the illustrative embodiment, the power generation head assembly 12' comprises a number of subcomponents, namely: a cathode element support plate 34' having a plurality of isolated channels permitting the free passage of oxygen (O2) through the bottom portion of each such channel; a plurality of electrically-conductive cathode elements (e.g. strips) 36' having undulating surface characterstics (to increase the surface area thereof) 36', for insertion within the lower portion of these channels, respectively; and a plurality of electrolyte-impregnated strips 37' for placement over the cathode strips 36', and support within the channels 35', respectively, as shown in FIG. 4C2.

In the illustrative embodiment, electrolyte-impregnated strips are realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for each power generating cell is made from a formula consisting of an alkali solution, a gelatin material, water and additives known in the art.

In the illustrative embodiment each cathode strip having undulating surface characteristics is made from a sheet of nickel wire mesh 38' coated with porous carbon material and granulated platinum or other catalysts 39 to form a cathode suitable for use in metal-air FCB systems. Preferably, the thickness of the cathode element is about 25 mm, with a pitch of about 2.5 mm. Details of cathode construction are disclosed in U.S. Pat. Nos. 4,894,296 and 4,129,633, incorporated herein by reference. To form a current collection pathway, an electrical conductor 40' is soldered to the underlying wire mesh sheet of each cathode strip. As shown in FIG. 5A2, each electrical conductor 40' is passed through a hole 41' formed in the bottom surface of a channel of the cathode support plate 34', and is connected to the output voltage configuration subsystem 66'. As shown, the cathode strip 36' pressed into the lower portion of the channel to secure the same therein. As shown in FIGS. 5A2 and 5A3, the bottom surface 42' of each channel 35' has numerous perforations (i.e. holes or apertures) 43' formed therein to allow the free passage of air (e.g. oxygen) therethrough to the corresponding cathode strip (at atmospheric temperature and pressure). In the illustrative embodiment, an electrolyte-impregnated strip 37' is placed over a cathode strip 36' and is secured within the upper portion of the cathode supporting channel. As shown in FIG. 5A3, when the cathode strip and thin electrolyte strip are mounted in their respective channel in the cathode support plate, the outer surface of the electrolyte-impregnated strip is flush with the upper surface of the plate defining the channels.

By its nature, the carbon material constituting the cathode elements is hydrophobic and thus repels water from the oxygen-pervious cathode elements. The interior surfaces of the cathode support channels are coated with a hydrophobic film material (e.g. Teflon) 45' to ensure the expulsion of water from within electrolyte-impregnated strips 37' and thus optimum oxygen transport across the cathode strips. Preferably, the cathode support plate is made from an electrically non-conductive material, such as polyvinyl chloride (PVC) plastic material well known in the art. The cathode support plate can be fabricated using injection molding technology also well known in the art.

The structure of the multi-tracked fuel card 85 of FIG. 4 is illustrated in FIG. 5B1. As shown, the metal fuel card comprises: an electrically nonconductive base layer 48' of substantially-rigid construction; a plurality of parallel extending, spatially separated strips of metal (e.g. zinc fuel) 49A', 49B', 49C', 49D' and 49E' disposed upon the base layer; a plurality of electrically non-conductive strips 50A', 50B', 50C', 50D' and 50E' disposed upon the base layer, between the parallel extending fuel strips; and a plurality of parallel extending channels (e.g. grooves) 51A', 51B'. 51C', 51D' and 51E' formed in the underside of the base layer, opposite the metal fuel strips thereabove, for allowing electrical contact with the metal fuel tracks through the base layer. Notably, the spacing and width of each metal fuel strip is designed so that it is spatially registered with a corresponding cathode strip in the power generation head of the system in which the fuel tape is intended to be used. The metal fuel card described above can be made by laminating zinc strips onto a layer of base material in the form of tape. The metal strips can be spaced apart sufficiently to ensure electrical isolation. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel card 85 can be polished to remove any electrical insulation material from the surface of the metal fuel strips which are to come in contact with the cathode structures during power generation.

In FIG. 5C2, an exemplary metal-fuel (anode) contacting structure (assembly) 52' is disclosed for use with the multi-tracked fuel card of the present invention. As shown, a plurality of electrically conductive elements 53A', 53B', 53C', 53D' and 53E' are supported from a metal-fuel contacting support platform 54' disposed immediately beneath the fuel card 85 by the power generation head transport subsystem when the fuel card is inserted with the storage bay 86 of the system. Each conductive element 53A' and 53E' supported by platform 54' has a longitudinal extent substantially equal to the length of the corresponding fuel strip on the fuel card. The upper edge of each conductive element has a smooth surface adapted for slidable engagement with one track of metal fuel through the fine groove formed in the base layer of the fuel card. Each conductive element 53A' through 53E' is connected to an electrical conductor which is connected to the output voltage configuration subsystem 19'. The anode-contacting support platform 54' is associated with the power generation head transport subsystem 20' and can be designed to be moved into position with the fuel tape during the power generation mode of the system, under the control of the system controller.

The Power Generation Head Transport Subsystem

During the Power Generation and Quiescent Modes of the system, the cathode element support structure 34' and anode contacting element support structure 54' are both transported to opposite sides of the multi-track fuel card 85, so that corresponding cathode and anodic metal-fuel strips are properly registered and establish ionically conductive connections, while corresponding anode contacting and metal-fuel elements are properly registered and establish electrically conductive connections therewith. In the second illustrative embodiment, this system function is carried out by the power generation head transport subsystem 20' which is realized by several components, namely: a cathode support structure translation mechanism 64' for moving the cathode support structure 34' into proper position with respect to the fuel card 85 within the power storage bay 86 so that each cathode element (and ionic pad) therein establishes an ionically conductive connection with its corresponding metal-fuel element on the fuel card (by way of its ionically conductive pad); and an anode contacting element transport mechanism 65 for moving each anode contacting element support structure 54' into proper position with respect to the fuel card within the storage bay 86 so that each anode contacting element therein establishes an electrically conductive connection with its corresponding metal-fuel element on the fuel card (by direct physical contact therewith). While all of the anode contacting elements 49A' through 49E' will establish electrical contact with the corresponding metal-fuel strips 78' while the fuel card is disposed in the storage bay 86, electricity will only be produced from those metal-fuel strips that have been configured into the system by output voltage control subsystem 19' to be described in greater detail hereinbelow.

The Output Voltage Control Subsystem

In the second illustrative embodiment of the present invention, the output voltage control subsystem 19' of the FCB system hereof comprises a number of subsystem components, namely: a load sensing circuit 65' operably connected to the output power terminals 7A, 7B, for automatically sensing the output voltage requirements for any electrical load 6 connected thereto, and producing an input signal to the system controller indicative of the connected load; and an output voltage configuration mechanism 66', responsive to the system controller 23', for automatically configuring the output voltages produced by selected tracks (e.g. cells) of the fuel card 85 in order to produce the required output voltage across the electrical load connected to the system.

In the second illustrative embodiment of the FCB system, the output voltage configuration subsystem 19' can be realized as an electrically-programmable power switching circuit. Such power switching circuitry can be constructed from transistor-controlled technology, in which five pairs of power supplying electrodes (derived from the five fuel tracks along the fuel card) are connected in either an electrically serial or parallel manner in order to produce different discrete values of output voltage to meet the requirements of an electrical load connected to the power output terminals of the system. In the case of zinc fuel material, the output voltage from each fuel track (e.g. cell) is 1.2 Volts. For a fivetrack FCB system, a 6.0 Volt power supply can be produced from the system by configuring the electrode pairs (from the fuel tracks) in electrical series configuration, in a manner well known in the art. Lower voltage power supplies can be configured by configuring one or more of the fuel cells in parallel configuration with other cells. Higher voltages can be produced using power conversion circuitry, in which regulated DC voltage power signals are chopped using switching circuits, harmonically filtered, transformed to higher voltages using inductors, rectified, and low-pass filtered in a manner well known in the regulated power supply art.

The Output Power Control Subsystem

In a preferred embodiment of the above-described stationary-anode type of air-metal FCB system, the main purpose of the output power control subsystem 22' is to regulate the output power produced across an electrical load connected to the power output terminals of the system shown in FIG. 4. In the illustrative embodiment, this function is carried out by controlling the flow of oxygen into the cathode structure of the power generation head of the system. In order to achieve these functions, the output power control subsystem 22' hereof comprises a number of subordinate subsystems, namely: an air-flow management subsystem 74'; an oxygen pressure (PO2) control subsystem 75'; and system controller 23'.

The oxygen pressure (PO2) control subsystem 22' is embedded about the power generation head 12'. In turn, the PO2 control subsystem 75' is controlled by the system controller 23'. The function of PO2 control subsystem 75' is to monitor the amount of O2 present within each porous cathode element in the power generation head using PO2 sensors 78' embedded therein. In response to the measured PO2 level, the PO2 control subsystem 75' controls the amount of O2 within the power generation head by controlling the flow of air through the rear surface of the cathode support plate 34' by way of air-flow management subsystem 74', which employs motor-controlled throttling panel 79' disposed over the air holes 43 formed in cathode plate 34' for controlled degrees of registration with air flow apertures 150' for air flow management, as hown in FIGS. 5A2 and 5A3.

During the power generation mode of the system, the system controller 23' monitors the output current into and output voltage across the electrical load connected to the system. These parameters are measured in real-time using output current sensing circuitry 76' and output voltage sensing circuitry 77', respectively, shown in FIG. 4A. Also, the system controller 23' monitors on a real-time basis the partial oxygen pressure (PO2) within the cathode structure using PO2 sensor 78' embedded within the cathode support plate, as illustrated in FIG. 5A2. A power output threshold Pout and a partial oxygen pressure threshold PO2 are set within the program storage memory (e.g. EPROM) associated with the system controller.

During power generation, the system controller 23' compares the measured output current and voltage (i.e. power output) against the power output threshold and PO2 threshold, and based on the comparison, sends appropriate control signals to motor 80 which controls the position of the air throttling plate 79' relative to the cathode support plate. In response thereto, these control signals increase or decrease the flow of air through the cathode support plate 34' so that the actual measured power output across the electrical load 6 is substantially equal to the power output value set in the program memory of the system controller. Conventional control theory can be used in order to achieve and optimize such desired control functions in an efficient manner.

In particular embodiments of the present invention, it may be desirable for the air-flow management subsystem 75' to include a variable-speed electric fan 81', operably connected to the system controller 23' in order to force ambient air over the rear surface of the air-throttling plate 79' and the cathode support structure 34' so that oxygen-rich air is continually supplied to the air-pervious cathode elements contained therein. The speed of electric fan 81' is controlled by the system controller in response output power requirements, humidity conditions sensed by humidity sensors 82 mounted within the interior of the system housing, and/or other conditions preprogrammed into the system controller. In such instances, the function of the humidity sensor 82 would be to determine when the relative humidity therein drops below a predetermined threshold value. A moisture control mechanism can be provided to increase the relative humidity to ensure that the electrolyte (i.e. Ionic medium) within electrolyte-impregnated strips 37' is optimally managed under by the system controller.

The System Controller

In the preferred embodiment of the FCB system of FIG. 4, the system controller 23' is realized using a programmed microcontroller having program and data storage memory and a system bus structure well known in the microcomputing and control arts. Each of the subsystems of the system are in communication with the system controller through the system bus. During the power generation mode of operation, the microcontroller produces controls signals for controlling the operation of the various subsystems thereof including the card loading/unloading subsystem 15' and the output voltage configuration subsystem 19'.

Figure 6:
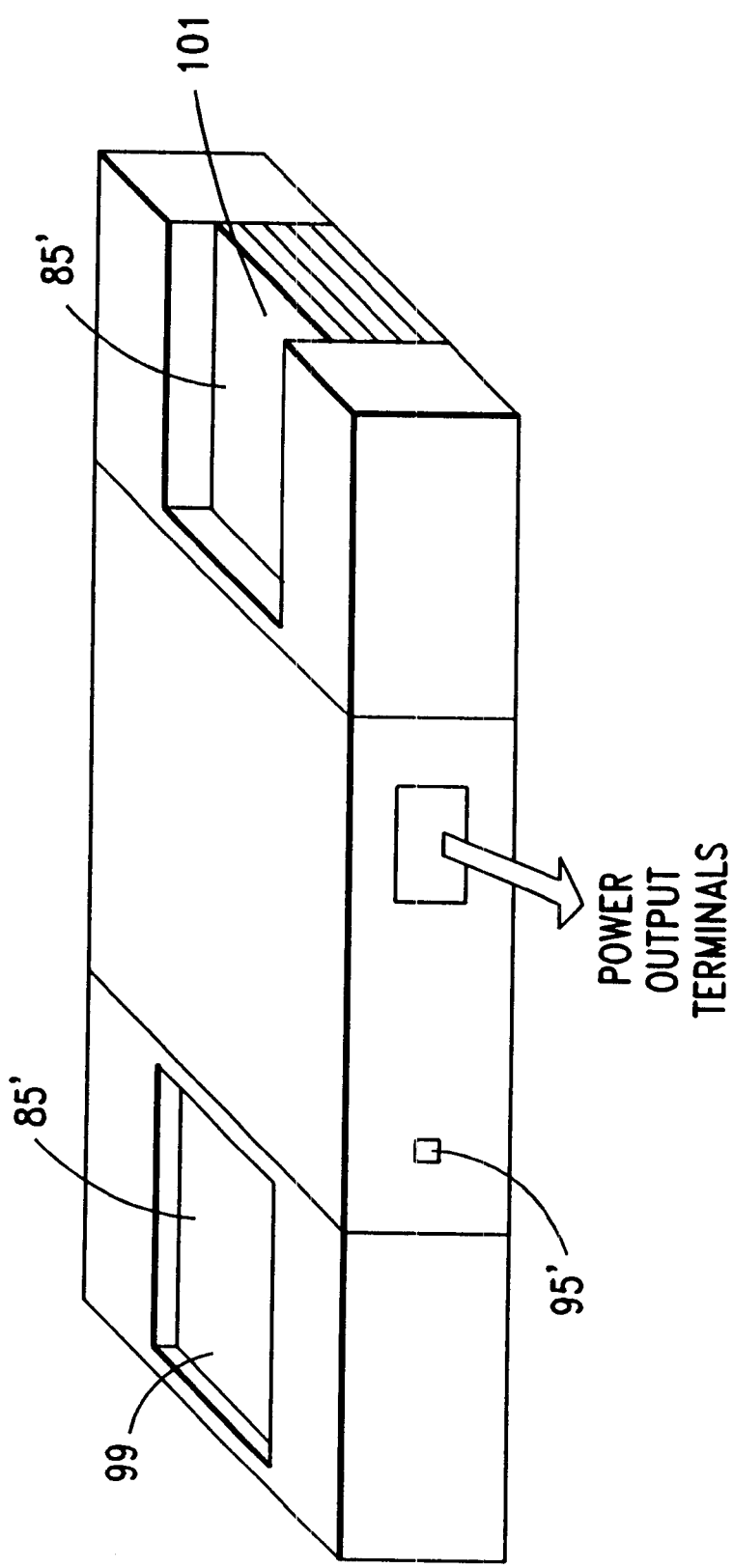
FIG. 6 is a perspective diagram of the metal-air FCB system of the third illustrative embodiment of the present invention, wherein an anodic metal-fuel card from the supply compartment thereof is automatically loaded into the power generation bay of the system, and the anode structure of the power generation unit is maintained in a stationary relationship with respect to the cathode structure thereof during power generation, and after the anodic fuel card is completed oxidized (i.e. consumed), it is automatically ejected into a collection compartment and another anodic fuel card is automatically loaded into the power generation bay for continuous power production.

The Third Illustrative Embodiment Of The Air-Metal FCB System Of The Present Invention FIG. 6 is a schematic diagram of the automatically-loading type air-metal FCB system of the third illustrative embodiment of the present invention. In this illustrative embodiment, metal-fuel cards 85' are automatically loaded into the power generation bay of the system as needed, and when consumed, are automatically ejected and another fuel card is automatically inserted in the power generation bay for power production.

Figure 7D:
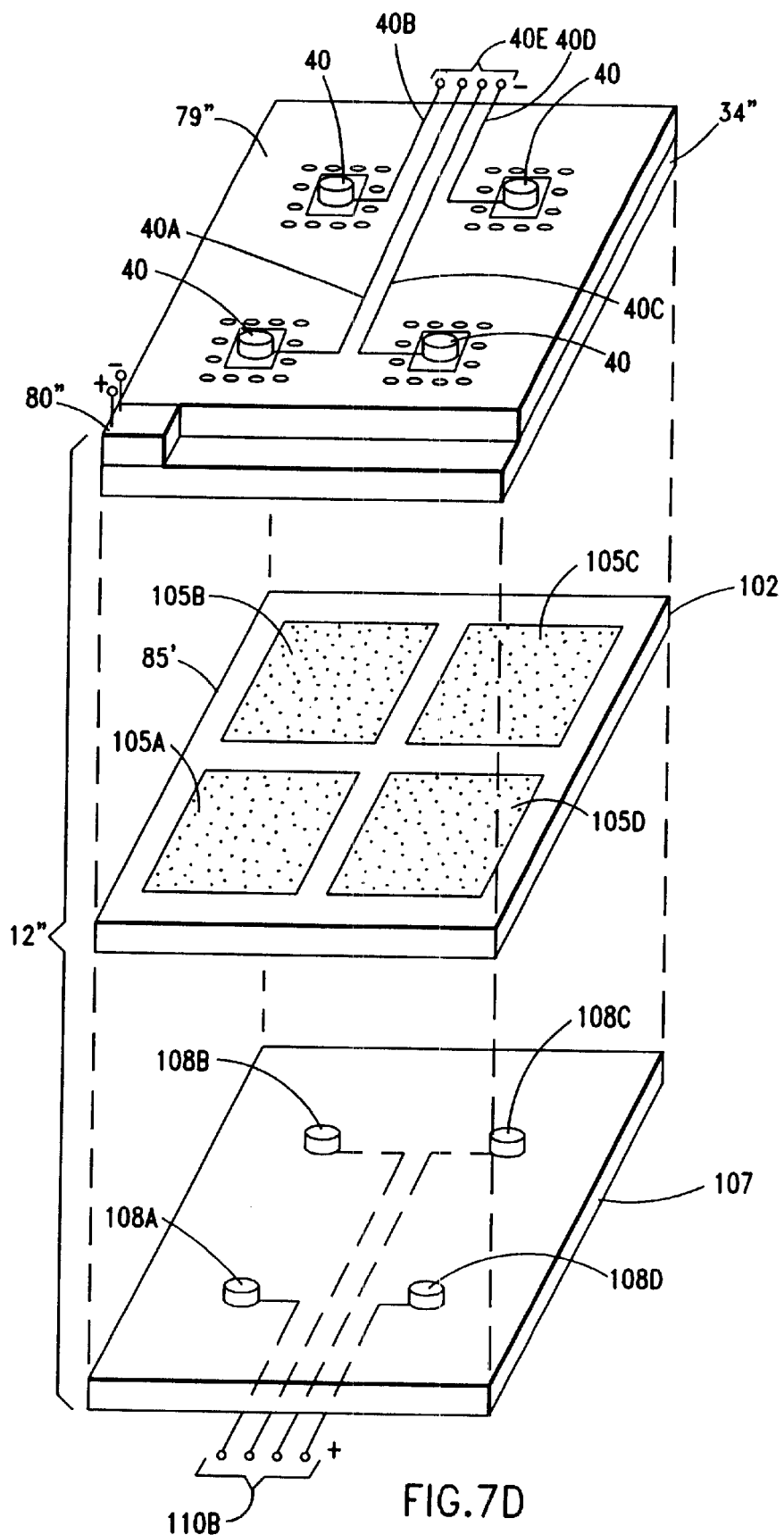
FIG. 7D is a perspective, exploded view of the power generation unit of the FCB system of FIG. 6, showing the cathode support structure, the anode support structure and the anode electrode contacting plate thereof in a disassembled yet registered relationship.

The design of the fuel card 85' for this illustrative embodiment is shown in FIG. 7B1 and described below. As shown in FIG. 7D, the fuel card 85' of this particular embodiment has a rectangular-shaped geometry with four electrically isolated metal-fuel squares 36" of equal size. As in the other described embodiments of the present invention, the fuel card of this particular embodiment is "multi-tracked" in order to enable the simultaneous production of multiple supply voltages (e.g. 1.2 Volts) from the "multi-track" power generation head assembly 12". As explained hereinabove in connection with the first and second illustrative embodiments, this novel construction enables the generation and delivery of a wide range of output voltages from the system.

The FCB system of the third illustrative embodiment has several modes of operation, namely: a Card Loading Mode during which the fuel card is loaded within the system; a Power Generation Mode during which electrical power is produced from the output terminal of the system and supplied to the electrical loaded connected thereto; a Quiescent Mode during which no electrical power is supplied to an electrical load connected to the system; and Card Unloading Mode during which the fuel card is unloaded from the system.

In order carry out such modes of system operation, the FCB of the third illustrative embodiment is provided with a number of subsystems, as schematically illustrated in FIG. 6, namely: an automatic fuel card loading/unloading subsystem 15" for automatically loading and unloading of a fuel card in to the FCB system during the Card Loading And Unloading Modes of operation, respectively; a power generation subsystem 17" for generating electrical power from the metal-fuel during the Power Generation Mode of operation; an output voltage control subsystem 19" for controlling the output voltage produced at the output power terminals 7A, 7B during the Power Generation Mode of operation; a power generation head transport subsystem 20" for transporting the power generation head of the system into "ionically-conductive" contact with the metal-fuel within the fuel card during the Power Generation and Quiescent Modes of operation; an output power control subsystem 22" for controlling the power output produced across the connected electrical load during the Power Generation Mode of operation; and a system controller 23" for cooperating with and managing the operation of the individual subsystems identified above during the various mode of operation of the FCB system. Details concerning each of these subsystems and how the cooperate will be described below.

The Fuel Card Loading/Unloading Subsystem

As shown in FIG. 6, the Fuel Card Loading/Unloading Transport Subsystem 15" of the third illustrative embodiment comprises: a fuel-card loading mechanism 98 for automatically selecting one fuel card 85' (from a supply thereof stored in supply compartment 99), and loading the fuel card into the fuel card storage bay 86' within the system housing; (optionally, and a fuel card unloading mechanism 100 for automatically unloading the fuel card 85' from the card storage bay 86' and transporting the fuel card to the collection compartment 101 in response to the consumption of the loaded fuel card or the depression of an "ejection" button 95' provided on the front panel of the system housing.

In the third illustrative embodiment, the card loading mechanism 92' can be realized as any suitable electromechanical mechanism capable of transporting a single fuel card (at a time) from the supply compartment 101 into the storage bay 86' for use in power generation. A proximity sensor, mounted within the storage bay 86', can be used to detect the presence of a loaded fuel card therewithin. The signal produced from the proximity sensor can be provided to the system controller in order to initiate the Quiescent Mode of operation in an automated manner. Card unloading mechanism 101 can also be realized using any suitable electromechanical mechanism capable of automatically transporting a consumed fuel card from storage bay 86' to the collection compartment 101 for reconditioning by an external device.

Loading of a "fresh" fuel card from supply compartment 99 occurs automatically whenever an electrical load demands electrical power from the FCB system and the output power falls below a predetermined power threshold detected by the system controller 23'. Likewise, unloading of a consumed fuel card from the storage bay 86' occurs automatically prior to loading a fresh fuel card into the storage bay 86'. Sequential control of such unloading and loading operations (i.e. mechanisms) is managed by the system controller 23" in a preprogrammed manner. When the button 95 is depressed, the mode of the system is automatically switched to the Card Unloading Mode of operation (i.e. the power generation head components move away from the metal-fuel tape card), and the fuel card is automatically transported from the card storage bay 86', to the collection compartment 101. Typically, this mode would be selected when desiring to remove the fuel card from the storage bay 86' prior to carrying out repair, maintenance and/or inspection operations.

The Power Generation Subsystem

The power generation subsystem 17" of the third illustrative embodiment shown in FIG. 6, comprises: a power generation (i.e. discharging) head assembly 12" having a multi-element cathode structure and anode contacting structures; a power generation-head translation mechanism 20" for moving the power generation head 12" into proper position with respect to the fuel card 85 during the power generation mode; and the system controller 23" for managing the operation of such subsystems during the various modes of system operation. Referring to FIGS. 7A through 7D, the multi-track power generation head assembly 12"

employed in the system of FIG. 6 will be described in greater technical detail.

In the third illustrative embodiment, the power generation head 12" comprises a number of subcomponents, namely: a cathode element support plate 34" having a plurality of isolated recesses 35" permitting the free passage of oxygen ($O_2$) through the bottom portion of each such recess; a plurality of electrically-conductive cathode elements (e.g. Squares) 36" for insertion within the lower portion of these recesses, respectively; and a plurality of electrolyte-impregnated strips 37" for placement over the cathode strips 36", and support within the recesses, respectively, as shown in FIG. 7D.

In the third illustrative embodiment, electrolyte-impregnated strips are realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the power generating cell is made from a formula consisting of alkali solution, a gelatin material, water, and additives well known in the art.

In the third illustrative embodiment, each cathode strip is made from a sheet of nickel wire mesh 38" coated with orous carbon material and granulated platinum or other catalysts 39" to form a cathode element that is suitable for use in metal-air FCB systems. Details of cathode construction for use in air-metal FCB systems are disclosed in U.S. Pat. No. 4,894,296 and 4,129,633, incorporated herein by reference. To form a current collection pathway, an electrical conductor (nickel) 40 is soldered to the underlying wire mesh sheet 38" of each cathode strip 36". As shown in FIG. 7B, each electrical conductor 40" attached to its cathode strip is passed through a hole 41" formed in the bottom surface of a recess of the cathode support plate, and is connected to the output voltage configuration subsystem 66" shown in FIG. 6B. As shown in FIG. 7D, the cathode strip pressed into the lower portion of the recess to secure the same therein.

As shown in FIGS. 7A and 7D, the bottom surface 42" of each recess has numerous perforations 43" formed therein to allow the free passage of air and oxygen therethrough to the cathode strip 36' (at atmospheric temperature and pressure). In the illustrative embodiment, an electrolyte-impregnated strip 37" is placed over a cathode strip 36" and is secured within the upper portion of the cathode supporting recess. As shown in FIG. 7D, when the cathode strip and thin electrolyte strip are mounted in their respective recess in the cathode support plate, the outer surface of the electrolyte-impregnated strip is disposed flush with the upper surface of the plate defining the recesses.

The interior surfaces 42" of the cathode support recesses are coated with a hydrophobic material (e.g. Teflon) 45" to ensure the expulsion of water within electrolyte-impregnated strips 37" and thus optimum oxygen transport across the cathode strips. By its nature, the carbon material constituting the cathode elements is hydrophobic and thus repels water from the oxygen-pervious cathode elements. Preferably, the cathode support plate is made from an electrically non-conductive material, such as polyvinyl chloride (PVC) plastic material well known in the art. The cathode support plate can be fabricated using injection molding technology also well known in the art.

The structure of the multi-tracked fuel card 85' of FIG. 6 is illustrated in FIGS. 7B and 7B1. As shown, the metal fuel card comprises: an electrically non-conductive anode support plate 102 of rigid construction, having a plurality of recesses 103A, 103B, 103C, 103D and 103E formed therein and a central hole 104 formed through the bottom surface of each recess; and a plurality of strips of metal (e.g. zinc fuel) 105A, 105B, 105C, 105D and 105E, each being disposed within a recess within the anode support plate. Notably, the spacing and width of each metal fuel strip is designed so that it is spatially registered with a corresponding cathode strip in the power generation head of the system in which the fuel card is intended to be used. The metal fuel card described above can be made by forming zinc strips in the shape of recesses in the anode support plate 102, and then inserting a metal fuel strip into each of the recesses. When inserted within its respective recess, each metal fuel strip is electrically isolated from all other metal fuel strips.

Figure 6B:
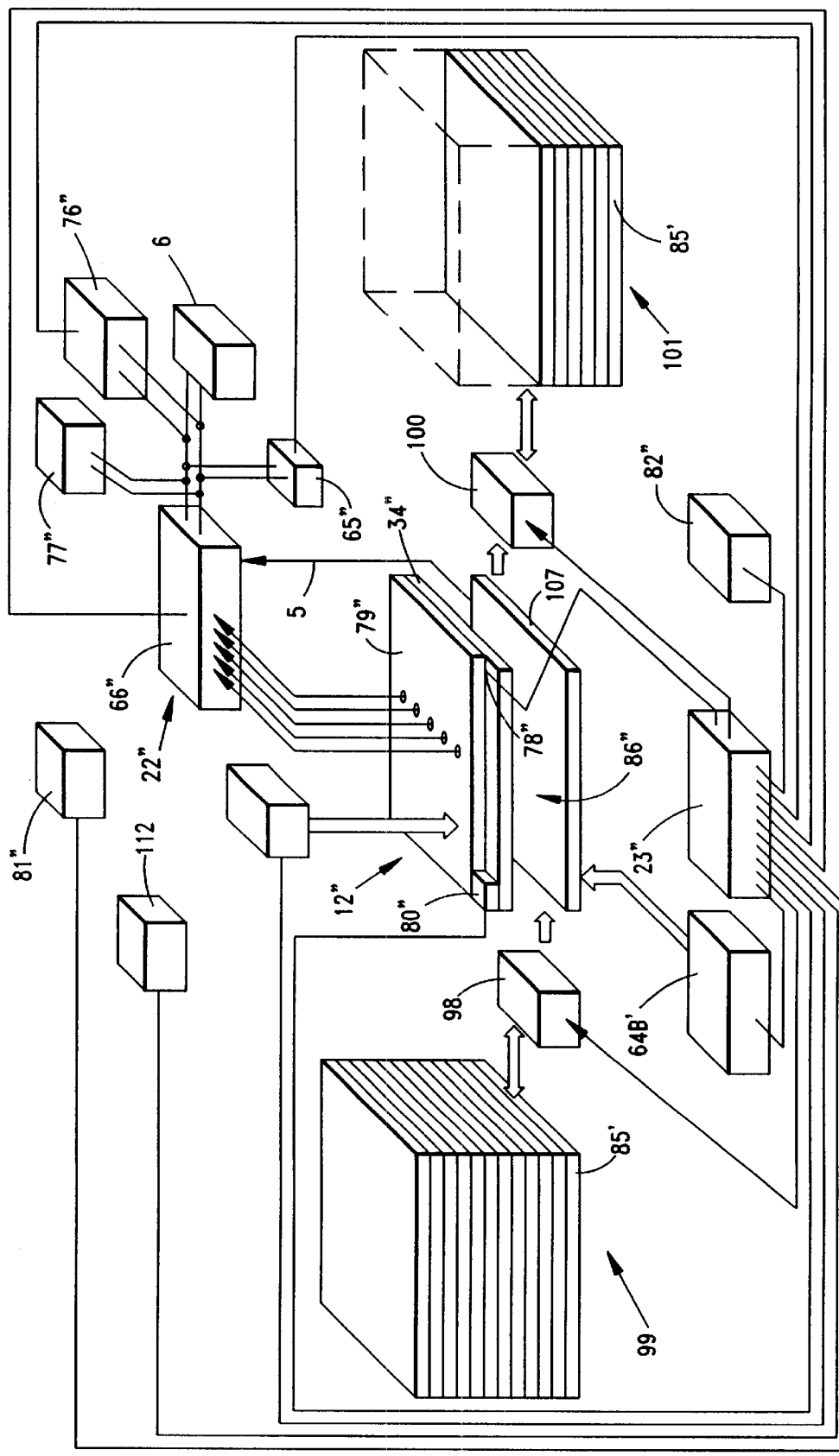
FIG. 6B is a schematic diagram of the air-metal FCB system of FIG. 6, wherein the subcomponents of its subsystems are described in greater detail.

In FIG. 7C, an exemplary metal-fuel (anode) contacting structure (assembly) 107 is disclosed for use with the multi-tracked fuel card having cathode support structure as shown in FIG. 7A. As shown, a plurality of electrically conductive elements 108A, 108B, 108C, 108D and 108E in the form of conductive posts are supported from a metal-fuel contacting support platform 109. The position of these electrically conductive posts spatially coincide with the holes 104 formed in the bottom surfaces of recesses 103A through 103E in the anode supporting plate 102. As shown, electrical conductors 110A through 110E are electrically connected to conductive posts 108A through 108E respectively, and anchored along the surface of the anode support plate (e.g. within a recessed groove) and terminate in a conventional connector 111. This connector is electrically connected to the output voltage configuration subsystem 66" as shown in FIG. 6B. The width and length dimensions of the anode contacting support plate 109 are substantially similar to the width and length dimensions of the cathode support plate 34" as well as the metal fuel support plate 102.

FIG. 7D illustrates the spatial relationship between the anode contacting support plate 109, cathode support plate 34" and anode (metal-fuel) support plate (i.e. fuel card) 102 when the fuel card is loaded therebetween. In this loaded configuration, each cathode element 36" along the cathode support plate establishes ionic contact with the front exposed surface of the corresponding metal fuel strip (i.e. zone) 105 by way of the electrolyte-impregnated pad 37" disposed therebetween Also, in this loaded configuration, each anode-contacting element (e.g. conductive post) projects from the anode contacting support plate 109 through the central hole 104 in the bottom panel of a recess formed in the anode contacting support plate 105 and establishes electrical contact with the corresponding metal fuel strip mounted therein, completing an electrical circuit through a single air-metal fuel cell.

The Power Generation Head Transport Subsvstem

During the Power Generation and Quiescent Modes of the system, the cathode element support structure 34" and anode contacting element support structure 109 are both transported to opposite sides of the multizone fuel card 85'''. Such movement enables corresponding cathode and anodic metal-fuel strips (i.e. elements) to be properly registered and ionically conductive connections established therebetween, while corresponding anode contacting and metal-fuel elements are properly registered and electrically conductive connections therewith established. In the third illustrative embodiment, this system function is carried out by the power generation head transport subsystem 20" which is realized by several components, namely: a cathode support structure translation mechanism 64" for moving the cathode support structure 34" into proper position with respect to the fuel card 85' within the power storage bay 86" so that each cathode element (and ionic pad) therein establishes an ionically conductive connection with its corresponding metal-fuel element on the fuel card (by way of its ionically conductive pad); and an anode contacting element transport mechanism 65' for moving each anode contacting element support structure 107 into proper position with respect to the fuel card within the storage bay 86" so that each anode contacting element (108A), therein establishes an electrically conductive connection with its corresponding metal-fuel element (105) on the fuel card (by direct physical contact therewith). While all of the anode contacting elements 108A through 108E will establish electrical contact with the corresponding metal-fuel strips while the fuel card is disposed in the storage bay, electricity will only be produced from those metal-fuel strips that have been configured into the system by Output Voltage Control Subsystem to be described in greater detail hereinbelow.

The Output Voltage Control Subsystem

In the third illustrative embodiment of the present invention, the output voltage control subsystem 19" of the FCB system hereof comprises a number of subsystem components, namely: a load sensing circuit 65" operably connected to the output power terminals 7A, 7B, for automatically sensing the output voltage requirements for any electrical load connected to the output power supply terminals 7A, 7B of the system, and producing an input signal to the system controller indicative of the size of the connected load; and an output voltage configuration subsystem 66", responsive to the system controller 23", for automatically configuring the output voltages produced from selected metal-fuel strips (e.g. cells) of the fuel card in order to produce the required output voltage across the load connected to the power supply terminals of the system.

In the third illustrative embodiment of the FCB system, the output voltage configuration subsystem 19" can be realized as an electrically-programmable power switching circuit. Such power switching circuitry can be constructed from transistor-controlled technology, in which four pairs of power supplying electrodes (derived from the four fuel elements on the fuel card) are connected in either an electrically serial or parallel manner in order to produce different discrete values of output voltage to meet the requirements of an electrical load connected to the power output terminals of the system. In the case of zinc fuel material, the output voltage from each fuel track (e.g. cell) is 1.2 Volts. For a four-zone FCB system, a 4.8 Volt power supply can be produced from the system by configuring the electrode pairs (from the fuel zones) in electrical series configuration, in a manner well known in the art. Lower voltage power supplies can be configured by configuring one or more of the fuel cells in parallel configuration with other cells. Higher voltages can be produced using power conversion circuitry, described hereinabove.

The Output Power Control Subsystem

In the third illustrative embodiment of the present invention, the output power control subsystem 22" comprises: air flow management subsystem 74"; PO2 sensing subsystem 75"; and system controller 23".

The air-flow management subsystem 74" of the third illustrative embodiment comprises: variable-speed electric fan 81" and humidity sensor 82", each operably connected to the system controller; and an air-throttling plate 79' disposed over the rear surface of the cathode support plate 79' and slidable relative thereto by motor 80". The function of electric fan 81" is to force ambient air over the rear surface of the cathode support structure 34" so that oxygen-rich is continually supplied to the air-pervious cathode elements contained therein. The speed of electric fan 81" is controlled by the system controller 23" in response to various sensed conditions including, for example, humidity conditions sensed by humidity sensors 82" mounted within the interior of the system housing. The function of the humidity sensor 82" is to determine when the relative humidity therein drops below a predetermined threshold value. In such instances, a moisture control mechanism 112 can increase the relative humidity to ensure that the electrolyte within electrolyte-impregnated strips 37" is optimally managed under by the system controller. The function of air-throttling plate 79 is to control the flow of oxygen rich air through the cathode support plate 34" towards the cathode and electrolyte embodying elements supported therein. Such oxygen control is achieved by controlling the position of the air-throttling plate 79" relative to cathode support plate 34" so that the air holes formed therein are brought into a degree of registration under the control of system controller 23".

The oxygen pressure (PO2) control subsystem 22" is embedded about the power generation head 12". In turn, the PO2 control subsystem 22" is controlled by the system controller. The function of PO2 control subsystem 22" is to monitor the amount of O2 present within each porous cathode element in the power generation head using PO2 sensors 78" embedded therein. In response to the measured PO2 level, the PO2 control subsystem controls the amount of O2 within the power generation head by controlling the flow of air through the rear surface of the cathode support plate 34" using a motor-controlled throttling panel 79" disposed thereover.

During the power generation mode of the system, the system controller 23" monitors the output current into and output voltage across the electrical load connected to the system. These parameters are measured in real-time using output current sensing circuitry 76" and output voltage sensing circuitry 77", respectively, shown in FIG. 6. Also, the system controller 23" monitors on a real-time basis the partial oxygen pressure (PO2) within the cathode structure using PO2 sensor 78" embedded within the cathode support plate 34", as illustrated in FIG. 7A A power output threshold Pout and a partial oxygen pressure threshold PO2 are set within the program storage memory (e.g. EPROM) associated with the system controller.

During power generation, the system controller compares the measured output current and voltage (i.e. power output) against the power output threshold and PO2 threshold, and based on the comparison, sends appropriate control signals to motor-controlled air throttling plate 79" and fan 81". In response thereto, these control signals increase or decrease the flow of air through the cathode support plate 34" so that the actual measured power output across the electrical load 6 is substantially equal to the power output value set in the program memory of the system controller. Conventional control theory can be used in order to achieve and optimize such desired control functions in an efficient manner.

Preferably, the system controller 23 controls the variable-speed electric fan 81" so as to force ambient air over the rear surface of the cathode support structure 34" so that oxygen-rich air is continually supplied to the air-pervious cathode elements contained therein. The speed of electric fan 81" can be controlled by the system controller in response output power requirements, humidity conditions sensed by humidity sensors 82" mounted within the interior of the system housing, and/or other conditions preprogrammed into the system controller. In such instances, the function of the humidity sensor would be to determine when the relative humidity therein drops below a predetermined threshold value. A moisture control mechanism can be provided to increase the relative humidity within the power generation head to ensure that the electrolyte (i.e. ionic medium) within electrolyte-impregnated strips 37" is optimally managed under by the system controller.

The System Controller

In the preferred embodiment of the FCB system of FIG. 6, the system controller 23" is realized using a programmed microcontroller having program and data storage memory and a system bus structure well known in the microcomputing and control arts. Each of the subsystems of the system are in communication with the system controller through the system bus. During the power generation mode of operation, the microcontroller produces controls signals for controlling the operation of each of the subsystems comprising the FCB system.

In the preferred embodiment of the FCB system of FIG. 6, the system controller 23" is realized using a programmed microcontroller having program and data storage memory and a system bus structure well known in the microcomputing and control arts. Each of the subsystems of the system are in communication with the system controller through the system bus. During the power generation mode of operation, the microcontroller produces controls signals for controlling the operation of the various subsystems under its management thereby ensuring that the electrical power is supplied to the connected load at the required output voltage.

Figure 8:
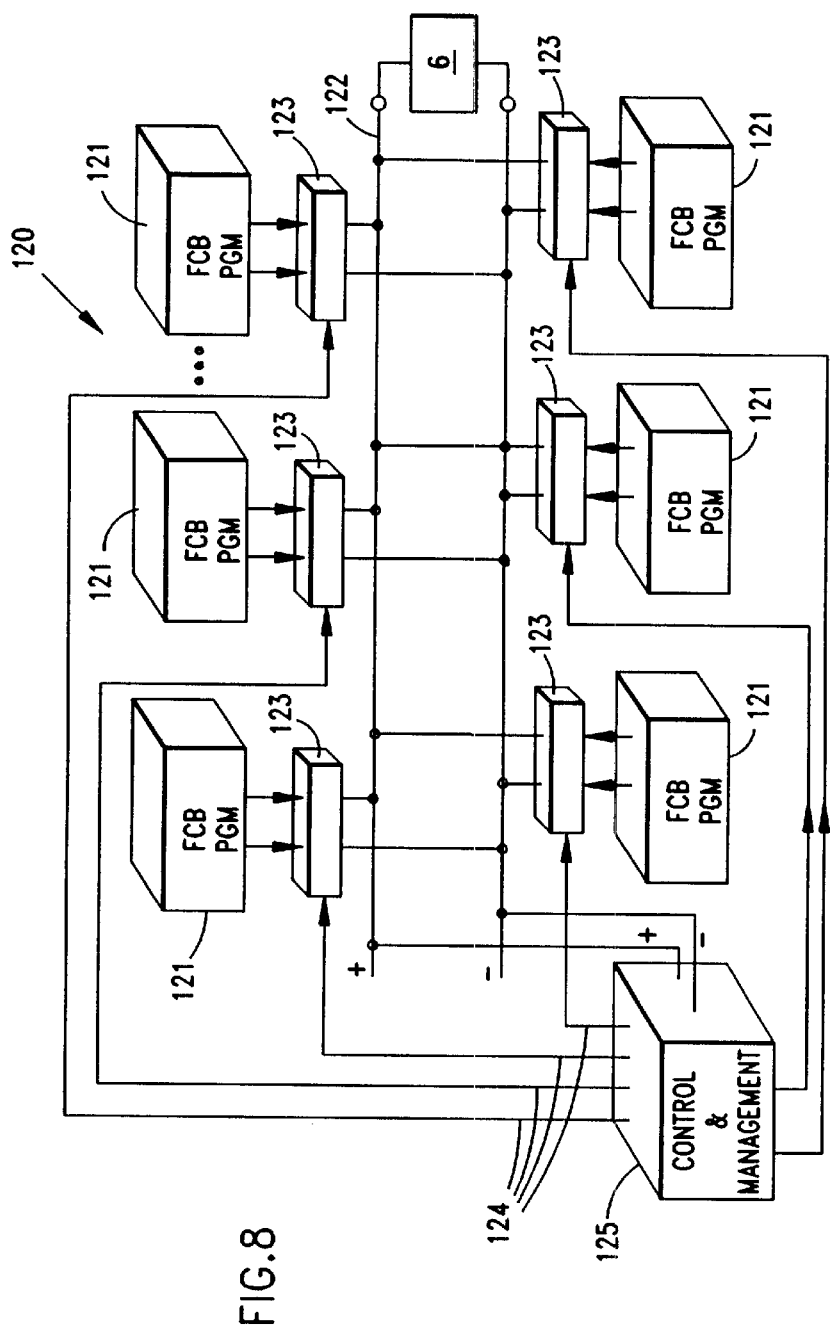
FIG. 8 is a schematic diagram of a FCB power generation system of the present invention realized by interfacing several building block power generation modules according to the principles of the present invention.

The Fourth Illustrative Embodiment Of The Air-Metal FCB System Of The Present Invention FIG. 8 shows a FCB power generation system 120, wherein several building block "FCB-type power generation modules (FCB PGM)" 121 according to the principles of the present invention described above are connected to a power bus 122 by way of electronically-controlled interface circuits 123 controlled by signal 124 generated by control and monitoring system 125. Each FCB PGM 121 can be any of the FCB systems of the present invention described hereinabove. The function each interface circuit 123 is to connect the output power terminals of its FCB power generation module 121 to the power bus 122 when the electrical load 6 thereon requires it to do so. The function of the control and monitoring system 125 is to sense such load conditions and generate the necessary control signals 124 to establish such interface connections with the power bus 122. In this embodiment, the power output from each of the power generation modules can be supplied using AC or DC techniques well known in the art.

Figure 9:
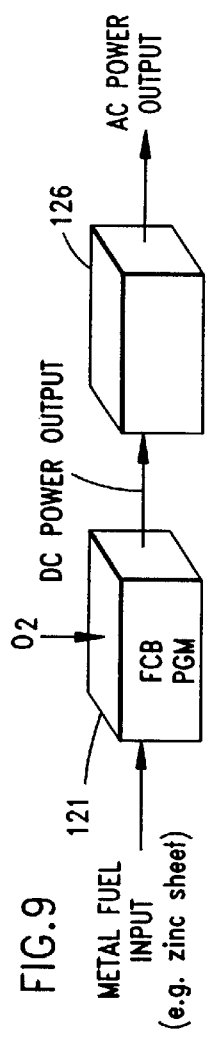
FIG. 9 is a schematic diagram of an alternating-current (AC) FCB power generation module constructed from a direct-current (DC) FCB power generation module and an invertor circuitry.

In FIG. 9, DC output power produced from an FCB-type power generation module of the present invention 121 is converted into AC output power using an invertor 126 well known in the electrical power conversion art.

Applications Of The Systems Of The Present Invention

The above-described FCB systems can be used to power various types of electrical circuits, devices and systems, including, but not limited to, lawn mowers, stand-alone portable generators, vehicular systems, and a nominal 200 kW power generation system.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. An apparatus for use in a metal-air fuel cell battery device wherein metal fuel is placed in ionic contact with at least one air-cathode element, a first conductive pathway electrically couples the air-cathode element to a first output terminal, and a second conductive pathway is electrically coupled to a second output terminal, the apparatus comprising:

a metal-fuel anode card including a substantially rigid and planar substrate comprising a non-electrically-conductive material, the substrate having a first side opposite a second side, and at least one metal fuel element disposed on the first side of the substrate; and at least one anode contacting element, corresponding to the at least one metal-fuel element, electrically coupled to the second conductive pathway and disposed on the second side of the substrate;

wherein the substrate of the metal-fuel card includes a plurality of apertures for electrical contact between the metal-fuel element disposed on the first side of the substrate and the corresponding anode contacting element disposed on the second side of the substrate when the metal-fuel card is spatially registered to the anode contacting element.

2. The apparatus of claim 1, wherein the metal-fuel element is disposed in a recess in the first side of the substrate.

3. The apparatus of claim 1, wherein the metal-fuel element comprises zinc.

4. The apparatus of claim 1, wherein the metal-fuel anode card further comprises a plurality of electrically isolated metal-fuel elements disposed on the first side of the substrate, wherein the apparatus includes a plurality of anode contacting elements corresponding to the plurality of metal-fuel elements, and wherein the substrate includes a plurality of apertures, corresponding, to the plurality of metal-fuel elements, for electrical contact between corresponding metal-fuel elements disposed on the first side of the substrate and corresponding anode contacting elements disposed on the second side of the substrate when the metal-fuel card is spatially registered to the plurality of anode contacting elements.

5. The apparatus of claim 4, wherein each metal-fuel element is disposed in an electrically isolated recess in the first side of the substrate.

6. The apparatus of claim 4, wherein each metal-fuel element comprises zinc.

7. A metal-air fuel cell battery device comprising:

at least one air-cathode element;

a first output terminal;

a first conductive pathway electrically coupling the cathode element to the first output terminal;

at least one anode contacting element;

a second output terminal;

a second conductive pathway electrically coupling the at least one anode contacting element to the second output terminal; and a metal-fuel anode card including a substantially rigid and planar substrate comprising a non-electrically-conductive material, the substrate having a first side opposite a second side and at least one metal-fuel element disposed on the first side of the substrate, wherein the substrate includes a plurality of apertures for electrical contact between the metal-fuel element disposed on the first side of the substrate and the at least one anode contacting element disposed on the second side of the substrate when the metal-fuel card is spatially registered to the anode contacting element.

8. The metal-air fuel cell battery device of claim 7, wherein the metal-fuel element is disposed in a recess in the first side of the substrate.

9. The metal-air fuel cell battery device of claim 7, wherein the metal-fuel element comprises zinc.

10. The metal-air fuel cell battery device of claim 7,
wherein the metal-fuel card further comprises a plurality of electrically isolated metal-fuel elements disposed on the first side of the substrate;
wherein the metal-air fuel cell battery device includes a plurality of anode contacting elements corresponding to the plurality of metal-fuel elements; and
wherein the substrate includes a plurality of apertures, corresponding to the plurality of metal-fuel elements, for electrical contact between corresponding metal-fuel elements disposed on the first side of the substrate and corresponding anode contacting elements disposed on the second side of the substrate when the metal-fuel card is spatially registered to the plurality of anode contacting elements.

11. The metal-air fuel cell battery device of claim 10, wherein each metal-fuel element is disposed in an electrically isolated recess in the first side of the substrate.

12. The metal-air fuel cell battery device of claim 10, wherein each metal-fuel element comprises zinc.

13. A metal air fuel cell battery device comprising
at least one air-cathode element;
a first output terminal;
a first conductive pathway electrically coupling the cathode element to the first output terminal;
a plurality of anode contacting elements;
a second output terminal;
a second conductive pathway electrically coupling the anode contacting elements to the second output terminal; and
a metal fuel anode card including a substantially rigid and planar substrate comprising a non-electrically conductive material, the substrate having a surface, and a plurality of electrically isolated metal-fuel elements disposed on the surface of the substrate, in electrical contact with corresponding anode contacting elements when the metal fuel card is spatially registered to the anode contacting elements.

14. The metal-air fuel cell battery device of claim 13, wherein each metal-fuel element is disposed in an electrically isolated recess in the first side of the substrate.

15. The metal-air fuel cell battery device of claim 13, wherein each metal-fuel element comprises zinc.

* * * * *